United States Patent
Daly, Jr. et al.

(10) Patent No.: US 12,304,397 B2
(45) Date of Patent: *May 20, 2025

(54) TOUCHSCREEN-BASED VEHICLE CONTROL INTERFACE

(71) Applicant: Metra Electronics Corporation, Holly Hill, FL (US)

(72) Inventors: Charles D. Daly, Jr., Holly Hill, FL (US); William H. Jones, Jr., Holly Hill, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/076,036

(22) Filed: Dec. 6, 2022

(65) Prior Publication Data

US 2023/0242047 A1  Aug. 3, 2023

Related U.S. Application Data

(63) Continuation of application No. 16/774,251, filed on Jan. 28, 2020, now Pat. No. 11,518,319, which is a continuation of application No. 14/814,078, filed on Jul. 30, 2015, now Pat. No. 10,579,232.

(51) Int. Cl.
| | |
|---|---|
| H04B 1/3822 | (2015.01) |
| B60R 11/02 | (2006.01) |
| G06F 3/0488 | (2022.01) |
| H04L 12/40 | (2006.01) |
| H04M 1/72412 | (2021.01) |
| B60R 11/00 | (2006.01) |

(52) U.S. Cl.
CPC ...... *B60R 11/0235* (2013.01); *B60R 11/0264* (2013.01); *G06F 3/0488* (2013.01); *H04L 12/40* (2013.01); *B60R 2011/0007* (2013.01); *H04L 2012/40215* (2013.01); *H04L 2012/40273* (2013.01)

(58) Field of Classification Search
CPC ............ B60R 11/0235; B60R 11/0264; B60R 2011/0007; G06F 3/0488; G06F 3/04886; H04L 12/40; H04L 2012/40215; H04L 2012/40273; H04B 1/082; H04B 1/3822; H04M 1/6083; H04M 1/724098
See application file for complete search history.

(56) References Cited

U.S. PATENT DOCUMENTS

| | | | |
|---|---|---|---|
| 8,826,261 B1* | 9/2014 | Anand Ag | G06F 8/654 717/173 |
| 11,518,319 B2* | 12/2022 | Daly, Jr. | G06F 3/04886 |
| 2012/0286798 A1* | 11/2012 | Matsuyama | G01R 31/52 324/538 |
| 2015/0248218 A1* | 9/2015 | Magahern | H04M 1/72484 715/740 |
| 2016/0264071 A1* | 9/2016 | Ujiie | H04L 9/3242 |
| 2017/0313248 A1* | 11/2017 | Kothari | B60R 1/28 |
| 2020/0256692 A1* | 8/2020 | Moore | G01C 21/36 |

* cited by examiner

Primary Examiner — Andrew Wendell
(74) Attorney, Agent, or Firm — J. Wiley Horton

(57) ABSTRACT

An interface/electronics module for reading information from a vehicle data bus and controlling functions available through the vehicle data bus. A graphical user interface is provided. The interface may include a stand-alone tablet computer or may be part of an integrated and permanently-mounted display. The interface/electronics module may include the functionality of the factory audio system (such as a radio tuner, power amplifier, etc.). In addition, the interface/electronics module is able to transmit commands via the vehicle's CAN bus.

20 Claims, 16 Drawing Sheets

TOUCHSCREEN-BASED VEHICLE CONTROL INTERFACE

CROSS-REFERENCES TO RELATED APPLICATIONS

This non-provisional patent application is a continuation of U.S. patent application Ser. No. 16/774,251. The parent application listed the same inventors.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of vehicles. More specifically, the invention comprises a display and control system for various vehicle devices that utilizes a touch screen as its primary operator interface.

2. Description of the Related Art

Modern vehicles include a wide variety of devices that are typically controlled by a human operator. Examples include audio components, blower fans, window motors, seat position motors, and mirror positioning motors. Many of these components have been traditionally controlled with a switch that selectively supplies current to a motor. Other components have been traditionally controlled using a rheostat. In recent years, however, digital interfaces have begun to dominate.

FIG. 1 shows a perspective view of a typical prior art vehicle interior—in this case a passenger car. Vehicle 10 includes center console 12 and dash 14. Factory radio 16 is mounted in the center console. It includes various buttons allowing the user to control the radio functions. For the particular car shown, environmental controls 18 are located immediately below the radio. The environmental control panel includes buttons allowing the user to select a cabin temperature, a fan speed, and various vent configurations.

Steering wheel 20 may also incorporate additional input features such as steering wheel controls 22. The steering wheel controls in this case allow the user to change the radio volume, change the audio source selected, change the vehicle's "cruise control" settings, and possibly control a cellular telephone. There is therefore some redundancy in the switching features. As an example, the user may reach over to the center console or the user may employ the switches on the steering wheel itself to control many of the same functions.

Until recent times the typical control switch was wired in series with the device it controlled. For example, a seat control switch simply "made" the power circuit to a motor driving the relevant portion of the seat for as long as the switch was closed. Other switches controlled the low-current side of a relay but the principle of operation was essentially the same. More complex switches were used for such devices as power mirrors, but the principle of operation was again the same for these devices as well. This is no longer the case, however, as the control of automotive components is rapidly shifting to the digital domain.

The general implementation of digital control uses a data bus distributed throughout the vehicle. The data bus sends digital messages (such as the state of a controlling switch) that may be received by any component connected to the bus. The data bus does not provide electrical power to the actuating components such as a seat motor (though it may supply some low level power to other devices). Power is supplied separately to the actuating components through a power distribution harness.

As far as the user is concerned, the new digital paradigm often appears to function just like the old analog paradigm. As an example, if the user wishes to roll down a window, he or she still presses a designated button and the window rolls down. However, the button is not "making" an analog circuit and is not serving as part of the path for the electrical current driving the window motor. Instead, both the button and the motor are hooked up to a data bus, and the data bus is likely hooked up to a controlling microprocessor (sometimes called a "Body Control Unit"). The switch sends a digital message specifying its identity and the fact that the switch is in an "ON" state. The Body Control Unit receives and interprets this message, then makes an appropriate response. In response to the window control button being placed in the "ON" position, the body control unit sends a digital message to the appropriate window motor instructing it to move the window. The window motor has an associated controller that receives and decodes this digital instruction. Power electronics within the window controller then activate a driving motor to move the window.

While the digital approach sounds complicated, it is in many instances much more efficient to install and run than a traditional system. Rather than routing dedicated wiring harnesses from switches to the components they control, the digital approach allows the vehicle manufacturer to provide a single data harness and only a few power harnesses. New components may also be added without the need to add additional wiring.

The first widely-used system implementing the digital paradigm was developed by Robert Bosch, GmbH in the early 1980's. Bosch called its system the "CAN bus," where "CAN" stands for "Controller Area Network." Bosch actually released its protocol to the Society of Automotive Engineers with the initial hope of creating a unified communication platform across all vehicle makes and models, though Bosch did not propose to offer the standard free of licensing fees.

The goal of a uniform standard has largely gone unrealized, with the various vehicle manufacturers adopting proprietary systems instead. Even so, the general characteristics of the original CAN standard are found in most vehicle operating protocols. In general, a CAN network is a "masterless" system in which various microcontrollers communicate without the need for one defined "host" computer. This is a significant feature, as a modern vehicle may contain as many as 70 separate electronic control units. The two most significant control units are typically the Engine Control Unit ("ECU") and the aforementioned Body Control Unit ("BCU"). However, as discussed in the preceding example, each individual window motor is likely to have a separate controller. Other controllers may be provided for a blower fan, an air conditioning compressor, power mirrors, air bags, air-inflated suspension "springs," an automatic transmission, and even small things like the dimming functions of a rear-view mirror.

The control of the factory audio equipment is now also done using digital commands over a data bus. If a user presses a steering wheel control 22 as shown in FIG. 1, a digital signal is sent along the data bus and the radio responds to that digital signal (such as a "volume up" command). Thus, the steering wheel controls are not connected directly to the audio component. Instead, both are connected to a common data bus.

The CAN bus itself is typically just a twisted-pair (two conductors twisted around a common axis to help cancel unwanted emissions). However, although no universal CAN standard for connectors has evolved, it is common to include the CAN pair in a four-wire cable. The four-wire cable then carries CAN−, CAN+, Power Voltage, and Ground. Using this single connector thereby allows the simultaneous connection of a component to the control bus and the power distribution bus.

FIG. 2 presents a very simple depiction of a CAN bus and other components that may be connected to it. A Body Control Unit ("BCU") monitors the CAN bus and, in this instance, provides a conduit to the Engine Control Unit ("ECU"). An OEM audio component ("factory radio") and OEM navigation component are connected to the CAN bus. Sensors and Switches are also connected to the CAN bus. Only four components are shown but modern vehicles typically have over one hundred individual components connected to a CAN bus.

FIG. 3 presents a simple depiction of several components and their electrical connections to both the CAN bus and the power harness. Each component (blower motor, window motor, seat motor, defrost actuator, window control switch, etc.) is connected in parallel to the CAN bus. In addition, each component needing power is connected to a power harness. Those skilled in the art will know that a single power harness will likely not be used, and that FIG. 3 is therefore overly simplistic. In most cases a high-current device like a blower motor will not be connected to the same power distribution bus as a low-current device like a window switch. However, FIG. 3 serves well to illustrate the general operating principles.

There are a wide variety of CAN interface products now in use. Many of these products allow the reading of vehicle diagnostic information off the CAN bus. Others allow the use of existing steering wheel controls with aftermarket audio components. While these components make use of the CAN technology, there is much more information available on a vehicle's data network than is typically being used or displayed. The available information varies for each type of vehicle but will often include: vehicle speed, engine speed, throttle position, gear selected, longitudinal acceleration, lateral acceleration, manifold pressure, coolant temperature, engine "error codes," tire pressure, stability control settings, ride height settings, cabin temperature, seat position, mirror position, light status, and bulb status.

In addition, the CAN bus also provides the opportunity to control many more features than the available operator interface may allow. As an example, an experience driver may wish to "override" certain features in specific circumstances. A failed coolant temperature sensor may produce an "overtemp" signal when the engine has just been started and is still cold. In response to this signal some Engine Control Units will restrict the available throttle settings, lock the engine in an idle condition, or actually shut the engine off. An experienced user will realize that a sensor has failed and the "overtemp" condition does not actually exist. It would be advantageous to allow the user to override the automated functions in this scenario, particularly if the vehicle is not in an area where stopping is convenient or safe. It would also be advantageous to allow the user to call up and display an oil temperature sensor (if available) as a proxy for the engine's coolant temperature.

The existing display and control functions, however, are largely stuck in the analog era. In other words, the digital display and control features tend to simply mimic the analog features they replaced. While this allows the driver to easily transition to the new technology, it also represents a lost opportunity for significant enhancement.

Incredibly powerful processors and associated memory devices are now available and affordable. Examples include APPLE's IPAD and comparable tablet devices based on the Android operating system. These devices have the ability to store and run very complex control and monitoring applications. In addition, these devices feature powerful and intuitive user interfaces. The interfaces are typically icon-based touch screens that are infinitely configurable and customizable. The present invention combines the use of these modern devices with the digital environment already in existence on vehicle data buses to unlock the full potential of digital display and control.

BRIEF SUMMARY OF THE PRESENT INVENTION

The present invention provides a convenient user interface system for reading information from a vehicle data bus and controlling functions available through the vehicle data bus. A touch-screen user interface is preferably provided as part of an interface/electronics module. The touch-screen may be part of a stand-alone tablet computer or part of an integrated and permanently-mounted display. The interface/electronics module preferably includes the functionality of the factory audio system (such as a radio tuner, power amplifier, etc.). In addition, the interface/electronics module communicates with the vehicle CAN bus. This communication allows the module to receive data and transmit commands.

Thus, commands originating at the user interface can be sent to the vehicle CAN bus and carried out by OEM vehicle components. In addition, information carried on the vehicle CAN bus can be sent to the interface and displayed to the user. Using this system, the user can be provided with practically any piece of information that is transmitted by the CAN bus and the user can be given the ability to control practically any function that is controlled by the CAN bus. In addition, separate software programs running in a processor associated with the interface may be used to automate the operation of CAN bus-controlled features.

Figure 1:
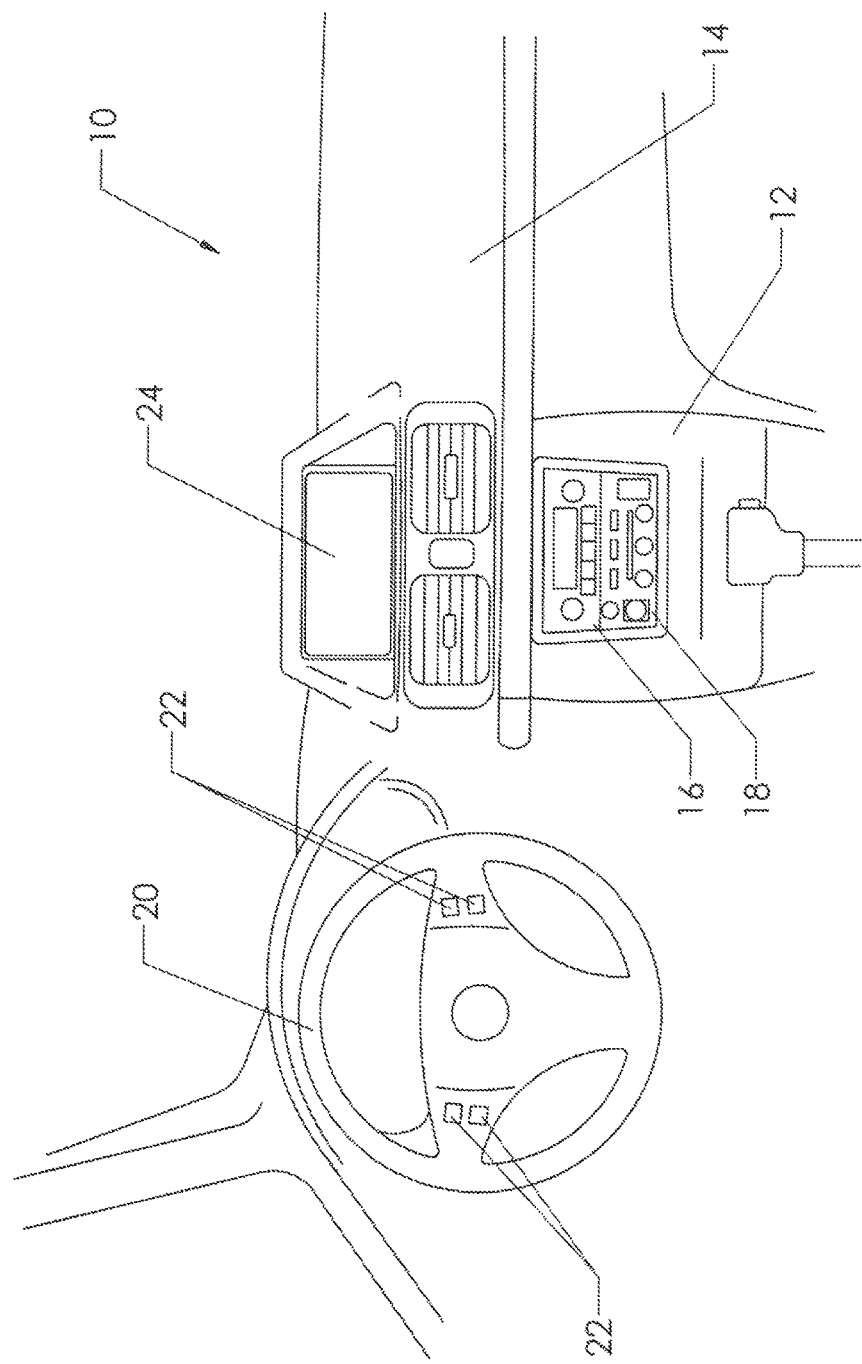
FIG. 1 is a perspective view, showing a prior art vehicle interior with typical controls.
Figure 2:
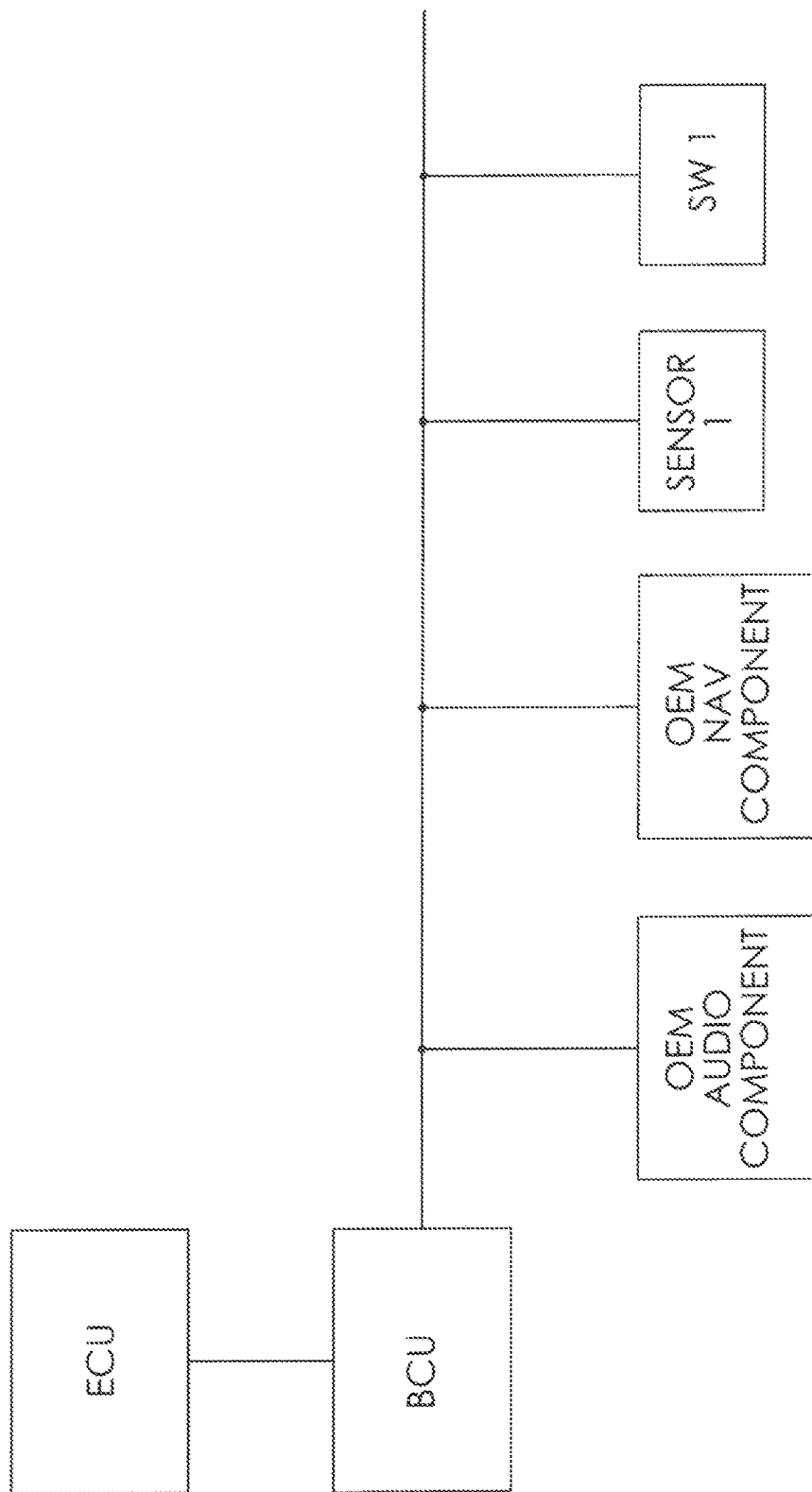
FIG. 2 is a schematic view, showing exemplary connections between vehicle components and a CAN bus.
Figure 3:
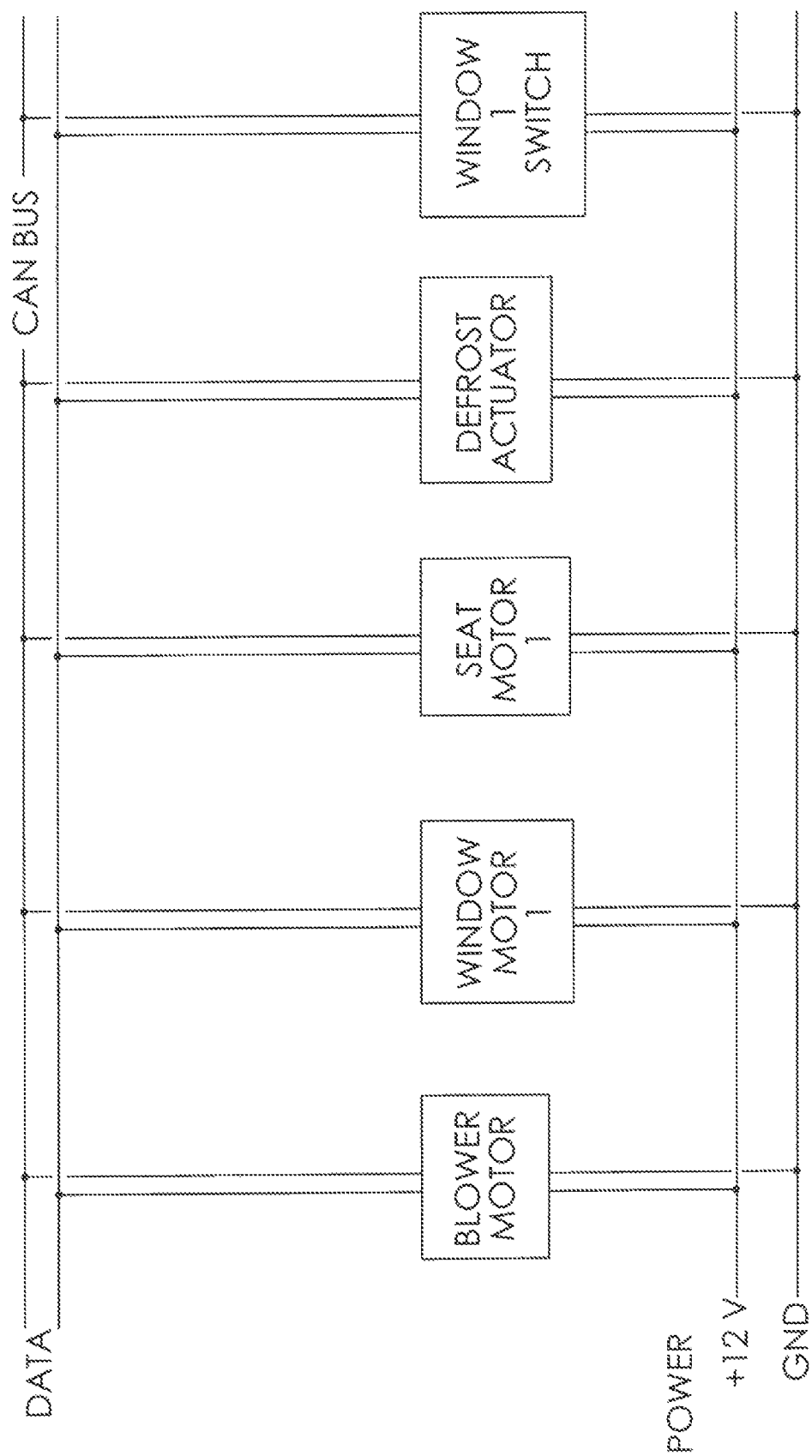
FIG. 3 is a schematic view, showing exemplary connections between vehicle components and a power bus.

REFERENCE NUMERALS IN THE DRAWINGS 10 vehicle
12 center console
14 dash
16 factory radio
18 environmental control
20 steering wheel
22 steering wheel control
24 factory video display
26 tablet receiver
28 cable
30 tablet
32 touch screen
34 mounting bracket
36 interface/electronics module
38 integrated touch screen module
40 fascia
42 CD slot
44 touch screen
46 connector
48 interface button
50 auxiliary hardware module
54 icon-based interface
56 touch screen module
58 physical key
60 housing
62 attachment feature
64 interface connector
66 vehicle-specific bezel
68 double-DIN opening
70 OEM control panel
72 module receiver
74 double-DIN stereo/NAV
76 data jack

DETAILED DESCRIPTION OF THE INVENTION

The present invention preferably uses a touch screen interface to provide display and control features for a vehicle operator. The physical touch screen may be part of an integrated module that is permanently added to the vehicle. On the other hand, the touch screen of an existing stand-alone device may be used. In the case of a stand-alone device, a separate interface module will likely need to be added to the vehicle in order to facilitate communication between the tablet, the CAN bus, and possibly other vehicle functions.

Figure 4:
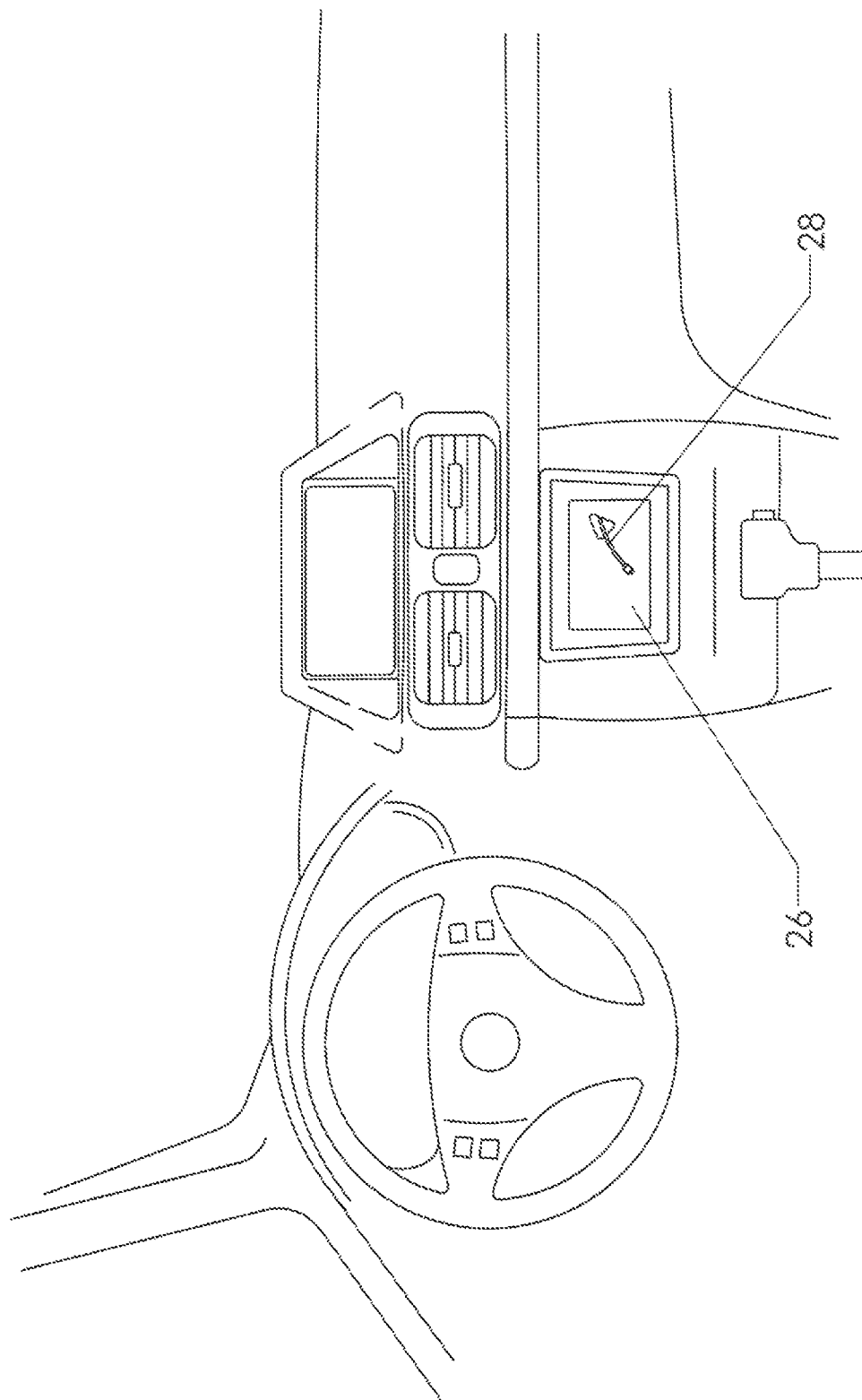
FIG. 4 is a perspective view, showing the installation of a tablet receiver in a vehicle interior.

FIGS. 4-8 illustrate embodiments in which a stand-alone tablet device is combined with other components to create the inventive interface/electronics module. In FIG. 4, the factory radio and environmental control panels have been removed and replaced with table receiver 26. Tablet receiver 26 includes a recess configured to receive a stand-alone tablet device such as an APPLE IPAD MINI or a SAMSUNG ANDROID-based tablet. The tablet receiver is preferably contoured to match the contours of the existing center console and dash. It may even be configured to engage the dash features that previously held the factory components. The color and texture of the tablet receiver may also be matched to the rest of the vehicle's interior.

In order for the stand-alone tablet to interface with the vehicle's CAN bus, a wired or wireless connection must be made. In the embodiment of FIG. 4, a wired connection is used. Tablet receiver 26 includes cable 28. The cable terminates in a connector that can be plugged into the stand-alone device. At the current time, mini-USB connectors are commonly used for this purpose. However, connector standards are evolving rapidly and the invention is by no means limited to any particular connector or type of connection.

Figure 5:
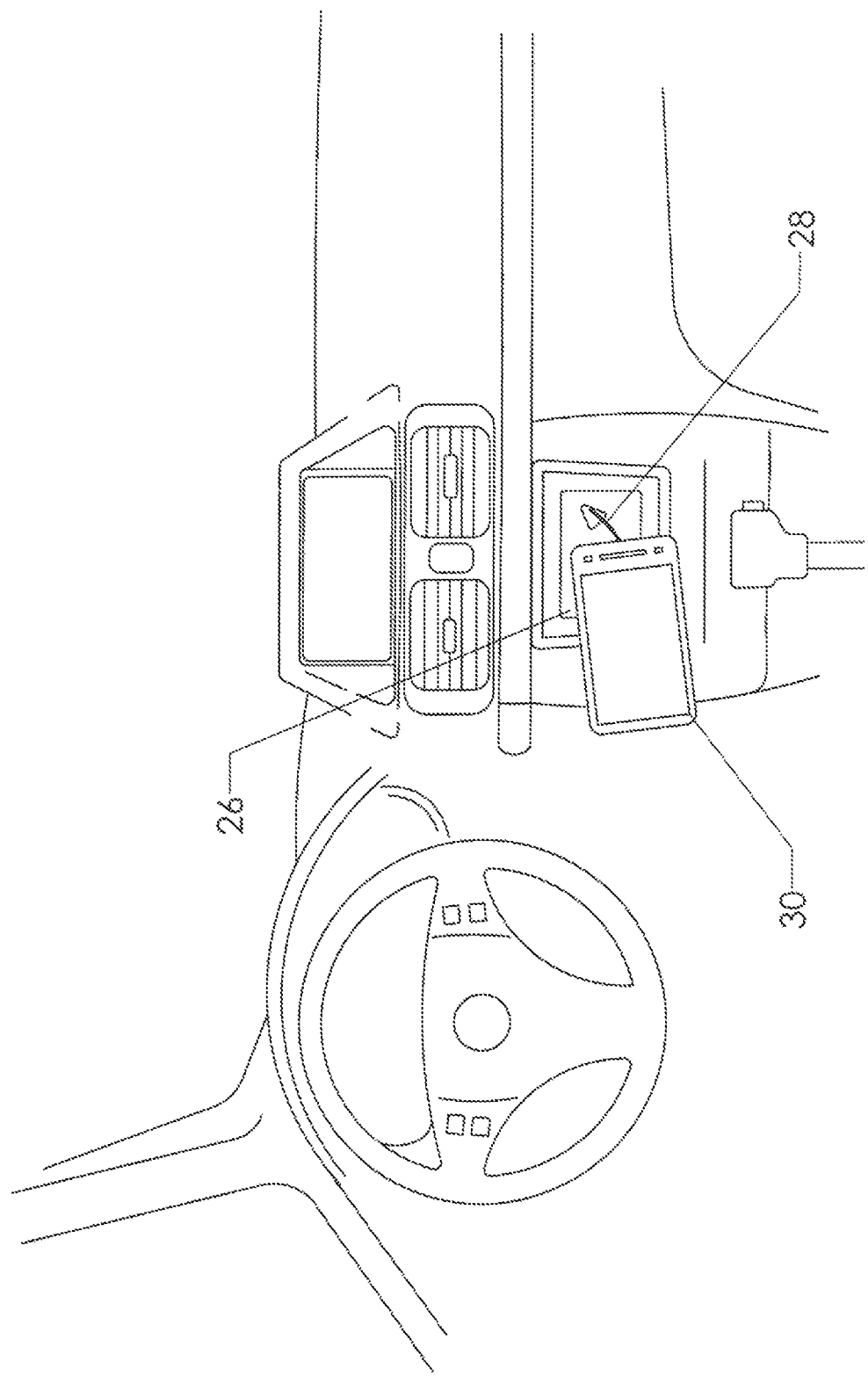
FIG. 5 is a perspective view, showing the installation of a tablet computer in the tablet receiver of FIG. 4.
Figure 6:
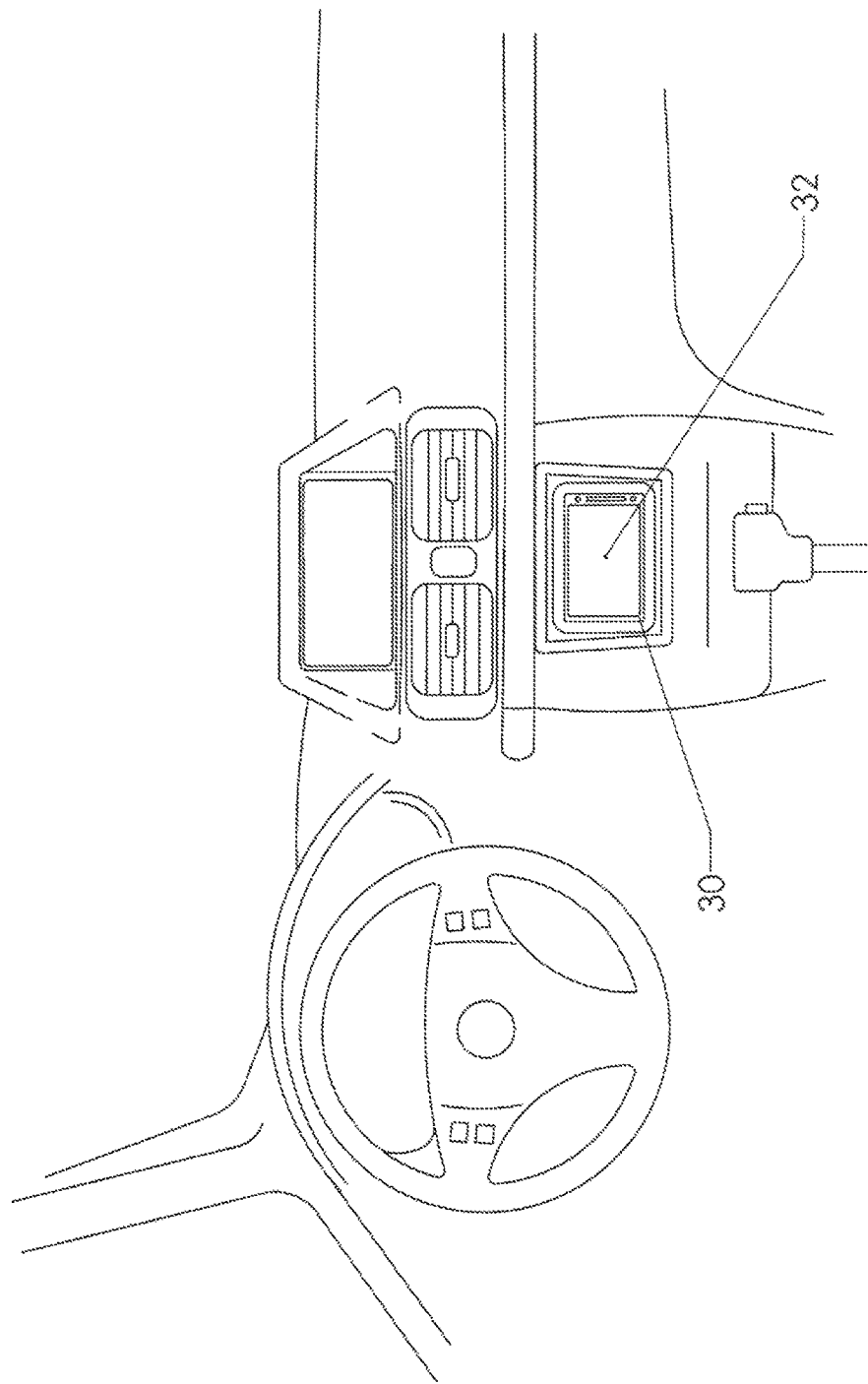
FIG. 6 is a perspective view, showing the completion of the installation referenced in FIG. 5.

Cable 28 is preferably long enough to allow it to extend as shown. This allows the cable to be connected to the stand-alone device before the device is placed in receiver 26. FIG. 5 shows tablet 30 after it has been connected to cable 28. The receiver is preferably designed so that the tablet at this point may be pressed into the open cavity and snapped into position. FIG. 6 shows tablet 30 after it has been snapped into the receiver. Touch screen 32 on the tablet faces outward and its entire surface is accessibly accessed by either the driver or passenger.

In the embodiment shown the shape of the receiver has been designed to smoothly blend the physical attributes of the tablet into the rest of the vehicle's interior. The tablet preferably appears to be a normal part of the dash. However, the user retains the ability to remove the tablet and use it apart from the vehicle. Since the tablet has replaced the factory radio and environmental controls, it is preferable for the tablet to provide control of those functions. The tablet will provide these functions, as will be described subsequently. However, some users may not wish to remove the factory controls.

Figure 7:
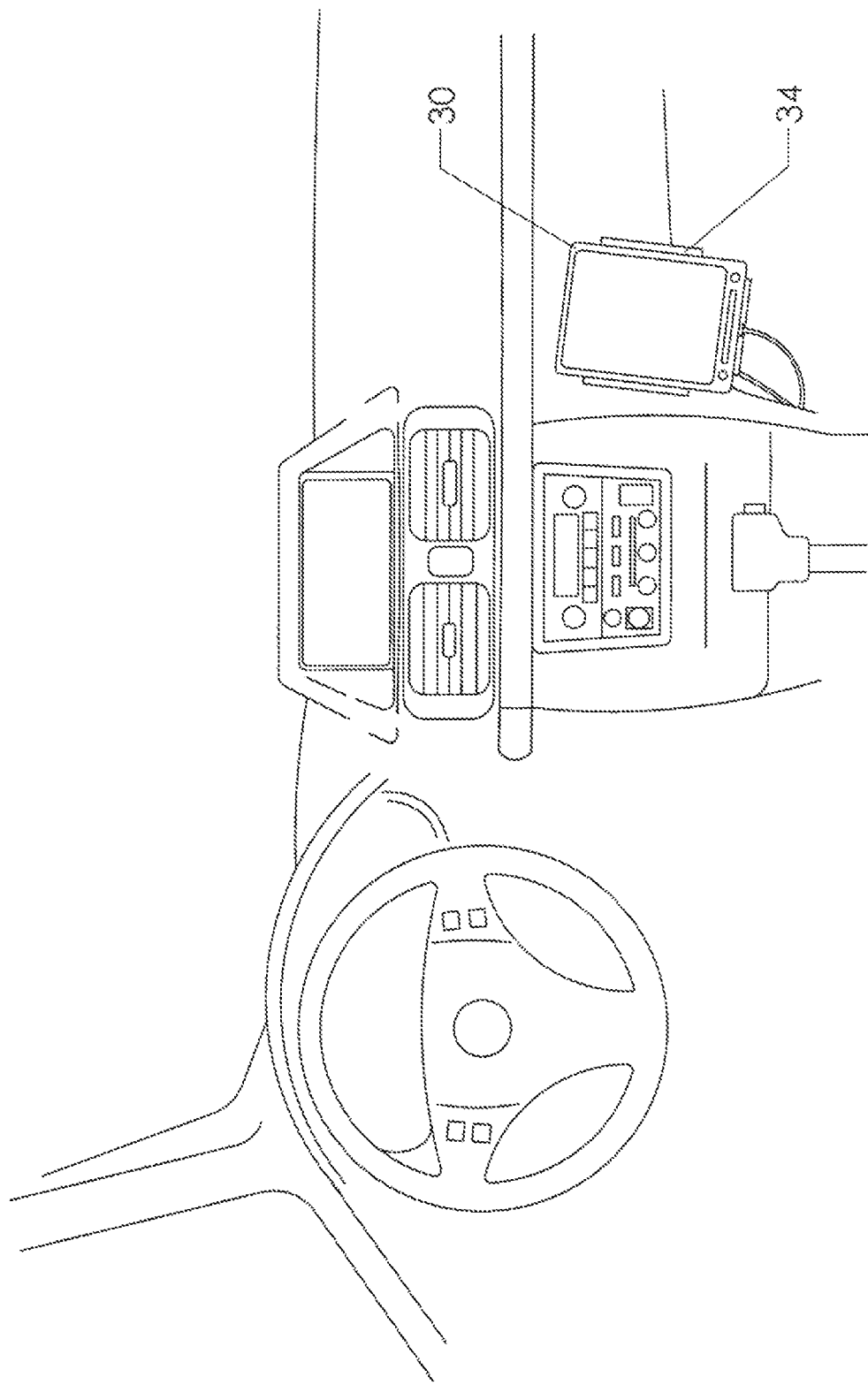
FIG. 7 is a perspective view, showing an alternate mounting arrangement for a tablet computer.

FIG. 7 shows an embodiment in which a tablet interface is added but the factory controls are retained. Mounting bracket 34 is added to the center console. This mounting bracket includes a tablet receiver that tablet 30 snaps into. The tablet is thus held securely in the position shown. In this embodiment, a cable connects the tablet to a separate interface module and the interface module connects to the CAN bus.

Depending on the vehicle make and CAN bus configurations, the tablet of FIG. 7 can provide parallel control of the functions of the radio and the environmental system. Alternatively, the user may be given the ability to switch between either the factory controls or the tablet. Even when the factory controls are used, the stand-alone tablet can still provide additional display functions.

Figure 8:
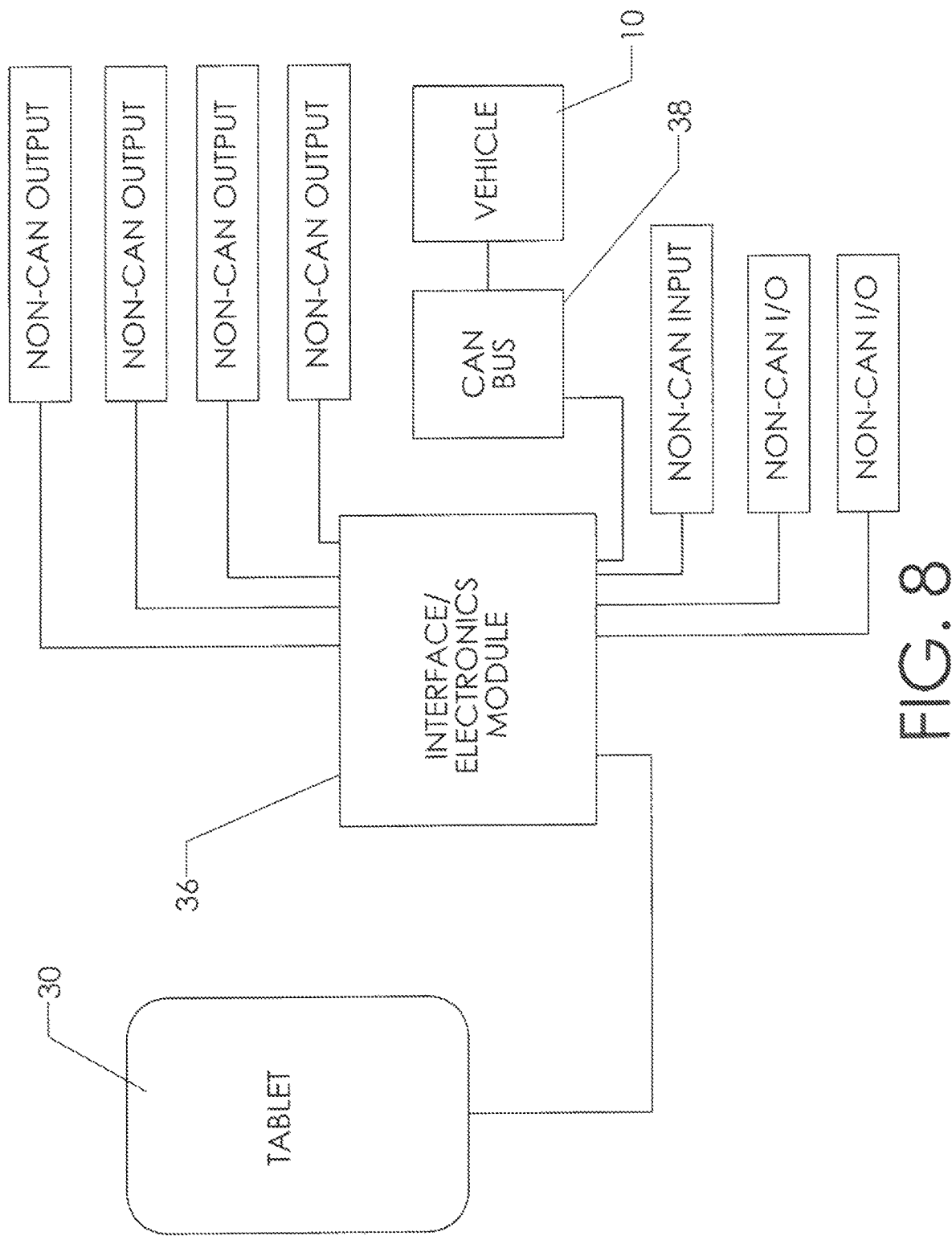
FIG. 8 is a schematic view, showing the integration of a tablet with the interface/electronics module and various vehicle systems.

As stated previously, it is preferable to provide a separate interface module to facilitate communication between a touch-screen interface device (like the stand-alone tablet) and the vehicle's CAN bus. The interface may provide communication with non-CAN components as well. FIG. 8 shows a block diagram of an interface/electronics module 36 using a separate table 30 to display information to the user and also receive user input. Interface/electronics module 36 is added and connected to CAN bus 38 of vehicle 10. It is also connected to tablet 30 or other touch-screen interface device. Interface/electronics module 36 reads digital messages from the CAN bus and sends these to tablet 30. It can also receive commands from tablet 30, put these in an appropriate CAN format, and place them on CAN bus 38. Thus, interface/electronics module 36 provides input and output functions for digital commands and information to and from the vehicle CAN bus. It preferably provides non-CAN inputs and outputs as well.

Not all significant vehicle electronic functions are carried on the CAN bus. One good non-CAN example is a vehicle's power audio system. In many vehicle's, low-power audio components (such as a CD player or a radio) feed an analog output to a high-power amplifier that feeds the speakers. Many factory radios combine the audio source and a power amplifier. Thus, if the factory radio is removed, the power amplifier is removed as well. The power amplifier is obviously needed for audio entertainment, but it provides other functions as well. In modern cars, warning buzzers and door-open "chimes" are not produced by separate audio components but are instead produced by the vehicle's audio entertainment system. Obviously, any replacement components preferably replace these functions as well.

It is possible to provide a power audio amplifier in interface/electronics module 36. Non-CAN outputs from the module can include speaker-driving circuits. Some vehicles have up to 8 separate speakers, so it is certainly desirable to provide an output to drive each available speaker. Non-CAN inputs may also be provided. One example of a non-CAN input is a simple +12V signal carried by the "ignition on" lead. This signal may be used to "wake up" the interface module and may even be used to power the module. Another example of a non-CAN input would be a detector circuit on an auxiliary audio jack.

Figure 9:
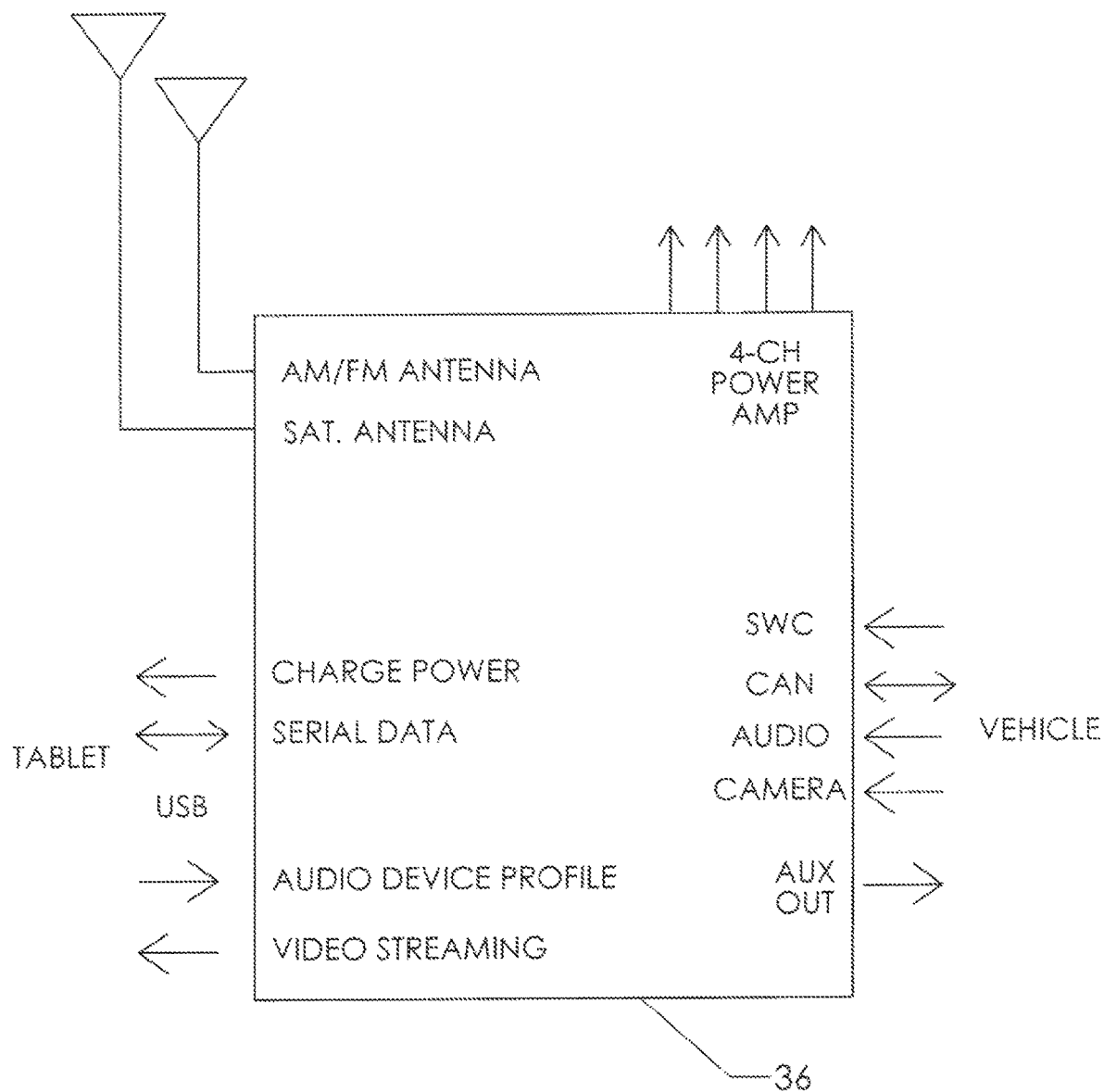
FIG. 9 is a schematic view, showing the functions of the interface/electronics module.

FIG. 9 is a more detailed block diagram showing some of the functions of an exemplary interface/electronics module 36. This example include a 4 channel power amplifier with analog outputs to drive the vehicle's speakers. AM/FM and satellite antenna inputs are provided for external antennas already mounted on the vehicle. The module may include a radio frequency tuner suitable for AM/FM broadcasts and another tuner suitable for satellite broadcasts.

The interface for the tablet (or other touch-screen device) is via a USB port in this example. Charge power for an external tablet is sent from the module to the tablet. Serial data may be streamed in either direction between the two devices. Audio device profile information may be sent from the tablet. Streaming video data may be sent from the interface/electronics module to the tablet (such as the signal from a "reverse camera" located on the rear of the vehicle). In some instances video data might be sent from the tablet to the module as well.

The vehicle interface is shown on the lower right of the block diagram. Steering Wheel Controls ("SWC's") may come into the module via individual conductors or over the CAN bus itself. The CAN bus connection is bi-directional, as explained previously. Audio data may come in from the vehicle. Camera data may come in from the vehicle. An "Aux Out" may also be provided. Most of the unidirectional communications can be made bidirectional if need be.

It should be noted that the electronics/interface module does not replace the microprocessors already installed in the vehicle. Instead, it operates largely in parallel, as one more component on the existing CAN bus network.

Figure 10:
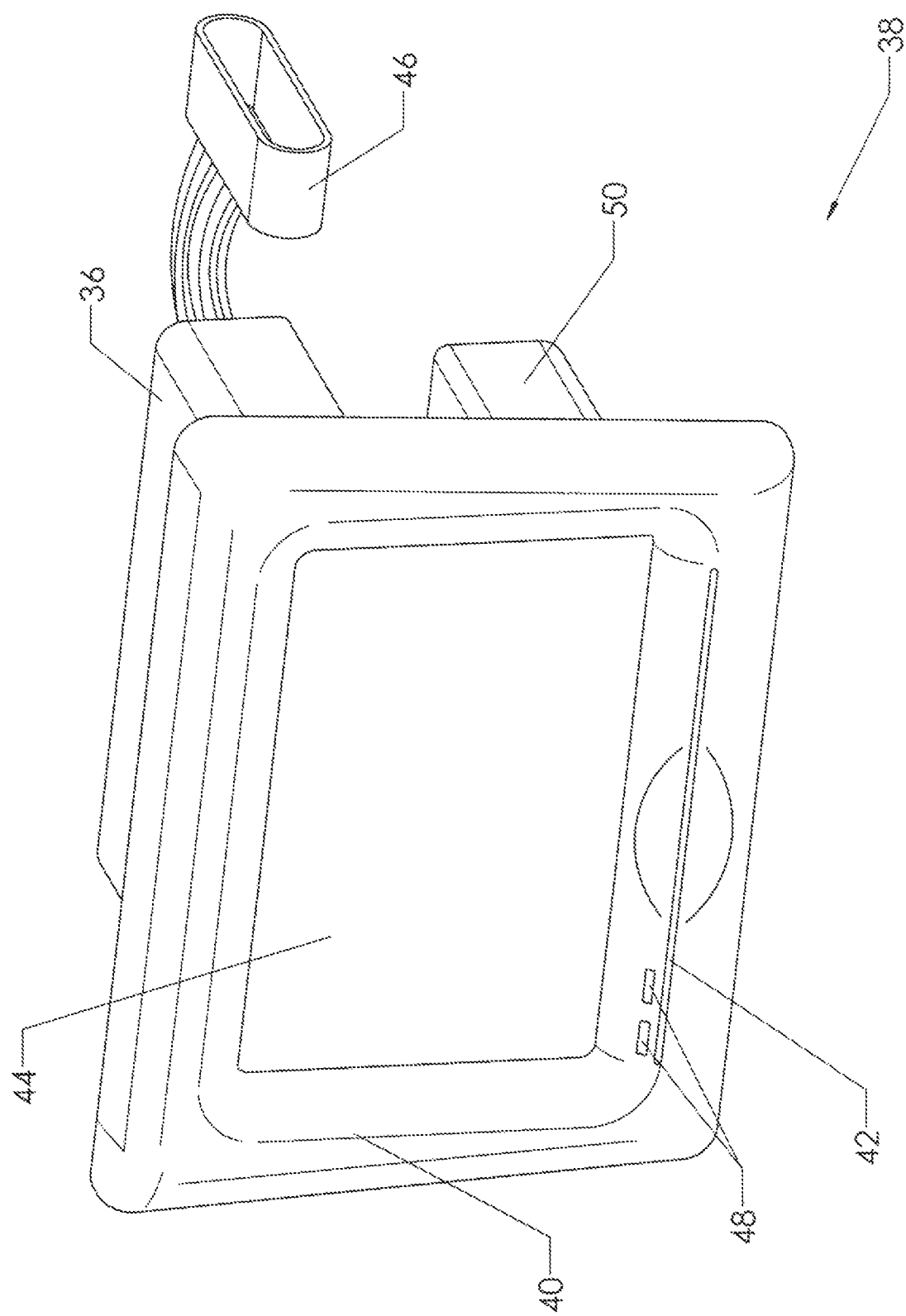
FIG. 10 is a perspective view, showing an integrated touch screen module.
Figure 11:
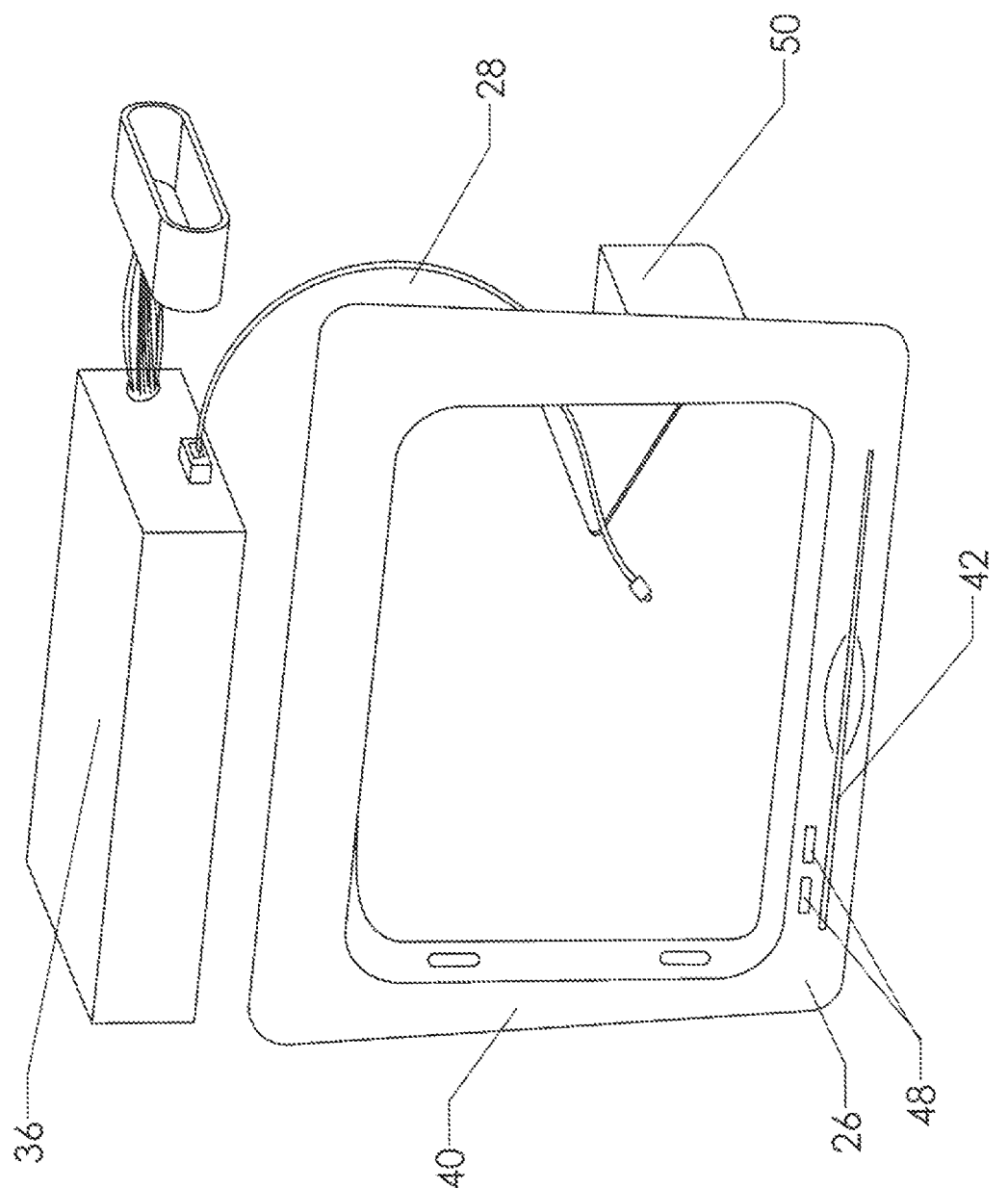
FIG. 11 is a perspective view, showing an embodiment in which the interface/electronics module is separate from the tablet receiver.

In the embodiment of FIG. 9 a separate tablet is used for the user interface. However, in other embodiments, a designated user-interface device may be provided as part of the electronics/interface module. FIGS. 10 and 11 show embodiments using this approach. In FIG. 10, integrated touch screen module 38 includes a dedicated touch screen 44 mounted in surrounding fascia 40. The surrounding fascia is designed to blend smoothly into the existing center console and dash assembly and may even replace a portion of the center console and dash assembly.

Interface/electronics module 36 is the complete assembly shown in the embodiment of FIG. 10. Auxiliary hardware module 50 is also provided in the same assembly. It may house a CD player that is accessible through CD slot 42. Physical interface buttons 48 may optionally be provided. Connector 46 attaches to the vehicle wiring harness (either directly or through a splicing harness). It connects the hardware modules to the CAN bus and possible other non-CAN components such as the vehicle speakers, etc.

FIG. 11 shows another embodiment of the fascia that is suitable for use with a stand-alone tablet device (such as shown in FIGS. 5 and 6). Tablet receiver 26 is configured to connect to the separate tablet. Cable 28 runs to a separate housing containing other functions of interface/electronics module 36. Auxiliary hardware module 50 is provided as part of the assembly.

In the embodiment of FIG. 11, interface/electronics module 36 may be located in any suitable position. It may be located up under the dash, in a center console, or even in a more remote location. Thus, though cable 28 is shown as a short device it may in fact be longer.

Figure 12:
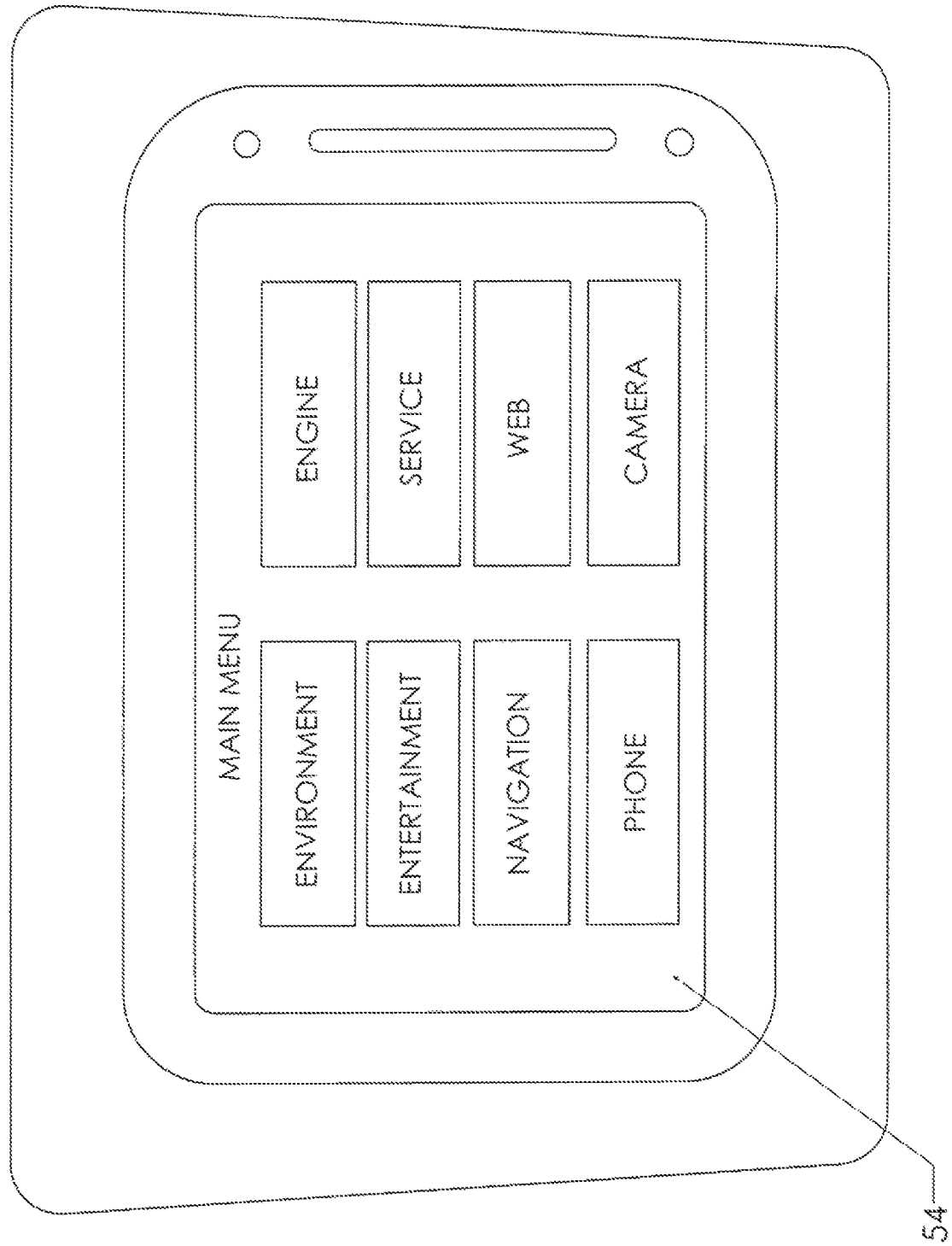
FIG. 12 is a view of a representative icon-based interface displayed on a tablet computer.

Having described some of the examples of the physical embodiments of the device, some explanation of its use will now be given. One objective of the present invention is the provision of a flexible and capable user interface allowing a user to access more of the digital capability of a car. FIG. 12 shows an exemplary user interface.

Once the system is installed—either using a removable touch-screen device or a touch-screen device actually installed in the car—the user is preferably presented with a graphical interface. As those skilled in the art will know, it is possible to create an infinite number of different graphical interfaces. The selection of menu structure and the icons used to select the choices are simply a matter of programming. Thus, the invention is not confined to any type of user interface and the depiction in FIG. 12 is intended to give only the most basic idea of what is possible. Even so, the menu structure shown in FIG. 12 serves to illustrate some of the capabilities the present invention provides.

A "Main Menu" is presented. The interface depicted has multiple layers. The user can make a first choice at the main menu and then proceed deeper and deeper into sub-menus. The user can also back out of the sub-menus at will. The user can make a selection by touching a particular area of the display. The user may also be given a track ball or other pointing device to move a cursor and make selections. However, because of its intuitive nature, the direct-touch method of selection is preferred. For this example, the main menu provides access to the following areas:

1. Environment—Selecting this option causes the current cabin temperature to be displayed and the outside air temperature to be displayed. In addition, the environmental control setting are displayed (desired temperature, fan speed, vent configuration, etc.). The user is given the option to make changes. For instance, using the touch screen, the user can increase the fan speed and change the vent configuration to "defrost."

2. Entertainment—Selecting this option causes the available radio, satellite, CD, and other external audio and video sources to be displayed. The user is given the option to change radio stations, or make other selections like changing from radio to satellite as the input.

3. Navigation—Selecting this option allows the user to pull up a moving map display and select destinations and routing. The mapping functions may be produced by an OEM NAV system remaining in the car, a NAV system within the tablet or installed display, or possibly streamed from an external device like a smart phone or GPS receiver.

4. Phone—Selecting this option allows the user to control a linked cell phone. A large and stationary touch screen is much easier to control than the smaller screen on a portable phone. In addition, the display in the present invention can provide large text that is easier to read while driving.

5. Engine—Selecting this option brings up a display of some or all of the available engine parameters such as coolant temperature, oil temperature, oil pressure, engine speed, boost pressure (on turbocharged vehicles), exhaust oxygen content. In some vehicles the user may be given the option to change certain operating parameters (such as allowing transient overboost conditions for a turbocharged vehicle).

6. Service—Many vehicles now include "service registers" that store a mileage countdown to the next service interval. Still others contain oil condition sensors that calculate custom service intervals. Selecting this option displays the dates of anticipated service based on manufacturer-specified intervals or some other basis. For instance, the dates could be presented for an oil change, a coolant change, and a front brake pad replacement.

7. Web—If the invention is linked to a cellular device or a WiFi portal web pages could be accessed using the display (though a safety lockout preventing use while driving might be appropriate).

8. Camera—Selecting this option displays the view of an available rear camera. Such a feature is conventionally used while reversing the vehicle.

Returning now to FIG. 8, the reader will appreciate that the present invention includes an installed interface/electronics module facilitating access to a vehicle's CAN bus and other systems. A user interface is displayed using either an installed component or a separate device like a tablet. Preferably, the assembled invention will automatically detect what type of vehicle it has been connected to. This is important because the invention needs to properly interpret the CAN messages it sees and these vary from manufacturer to manufacturer. The details of the auto-detection method and hardware are beyond the scope of this disclosure, but the reader who is interested in learning more about this is referred to co-owned U.S. Pat. No. 8,214,105, which is hereby incorporated by reference.

Stated briefly, the auto-detection feature monitors data traffic on the vehicle CAN bus and looks for particular sequences in order to determine the manufacturer-specific message format in use. CAN messages are encoded as a voltage difference between the CAN− and CAN+ lines (also known as the "CAN low" and "CAN high" lines). This is a form of differential signaling. Differential signaling is advantageous in the fairly noisy environment of a moving vehicle since amplitude interference on such lines will tend to self cancel.

In common CAN message formats a relatively low voltage difference between the two lines is decoded as a digital "1" and a relatively high voltage is decoded as a digital "0." When the interface/electronics module initially monitors the data on the bus, it will "see" intervals of low voltage and high voltage. One approach is to have the module look for specified standard patterns that identify a particular manufacturer. A second approach is to simply apply the message formats of different manufacturers one by one until valid CAN messages appear from the voltage patterns. Other approaches are available and the current invention may use any of these.

In addition, the availability of the touch screen interface makes the manual selection of a vehicle type much easier. The user may be given a menu and prompted to select a model year, manufacturer, and type of vehicle.

The embodiments described have explained some of the combinations possible in implementing the invention but of course many more combinations are possible. These include:

1. Wirelessly linking an external tablet to the interface/electronics module using BLUETOOTH or similar technologies;
2. Placing the user interface device and the interface/electronics module in a common housing;
3. Providing a pointing device as a user interface rather than a touch screen;
4. Providing a "soft key" user interface where physical buttons are arrayed around the display and the function of the physical buttons changes with other user selections;
5. Providing a separate power amplifier for the car's audio system;
6. Providing an infrared communication link between the tablet and the interface/electronics module; and
7. Shifting many of the functions of the interface/electronics module to a stand-alone device such as a tablet.

The user interface can provide a wide variety of selections and formats so that the individual user may select a format that appeals to his or her own taste. The user may be allowed to perform object-based programming as well. It may also be desirable to provide a "developer" application so that third party developers can create other customized interfaces.

Figure 13:
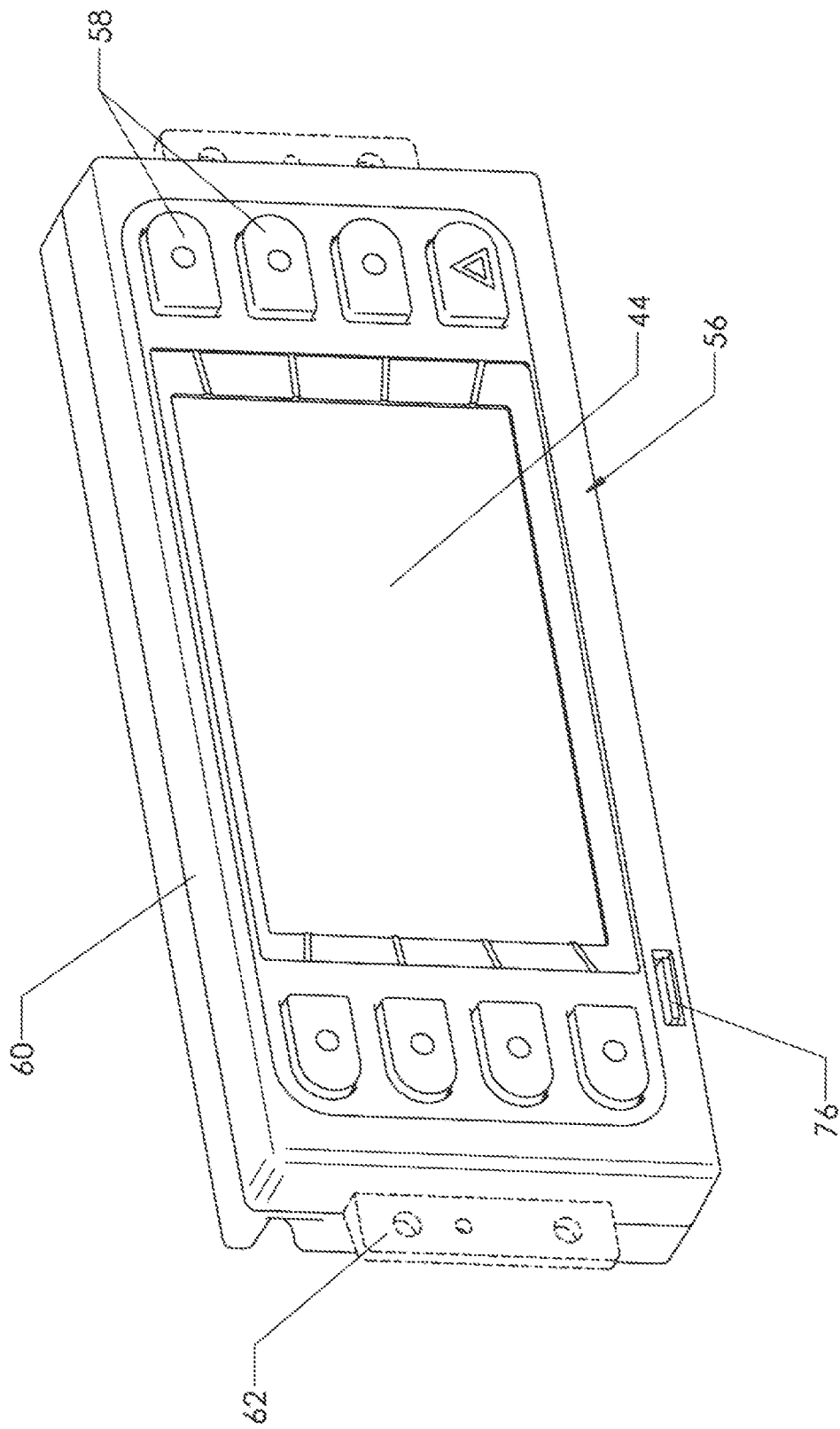
FIG. 13 is a perspective view showing an embodiment in which a touch screen display is packaged in a touch screen module.

For users wishing to integrate the inventive touch screen directly into the vehicle's dash, it may be advantageous to provide a dedicated touch screen module having a standard size and standard mounting features. FIG. 13 shows an exemplary touch screen module 56. Touch screen 44 and its supporting electronics are preferably contained within housing 60. One or more physical keys 58 may be provided for the user to push. Attachment features 62 may be provided to facilitate the mounting of the touch screen module in a vehicle.

Touch screen 44 displays a graphical user interface as described previously. The display changes based on user selections. For example, a particular available selection can be provided next to each of the physical keys 58. Thus, the function of each physical key may be varied depending upon where the user is in the menu structure. On the other hand, some or all of the physical keys may be given permanent functions. As an example, one key could always be used to select the home or root page of the menu structure.

Data jack 76 is optionally provided in an accessible location. This allows the user to plug in an external memory device. For example, a user experiencing an intermittent vehicle malfunction might like to "stream" the data values for engine parameters from a vehicle data bus through data jack 76 and to the external memory device. The data could then be provided to a service technician. Data jack 76 could also be used to update the software running on touch screen module 56.

Figure 14:
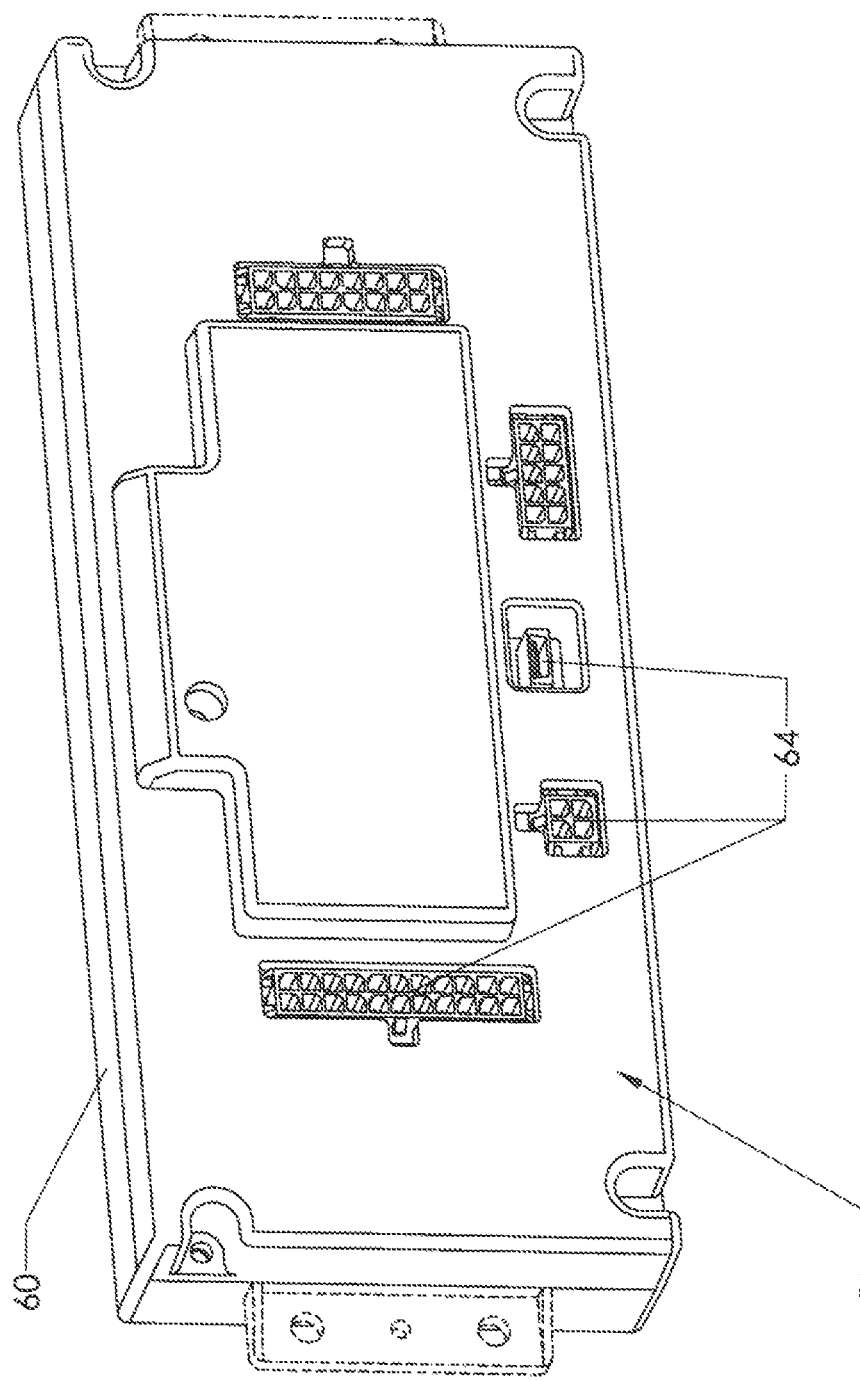
FIG. 14 is a perspective view, showing the rear of the touch screen module of FIG. 13.

FIG. 14 shows touch screen module 56 from the rear. Multiple interface connections 64 are preferably provided. These may include inputs such as vehicle power and CAN bus data. These may also include outputs such as vehicle-specific control outputs and audio preamplifier jacks. The connections shows are properly viewed as exemplary. Different vehicles may require different jacks.

Figure 15:
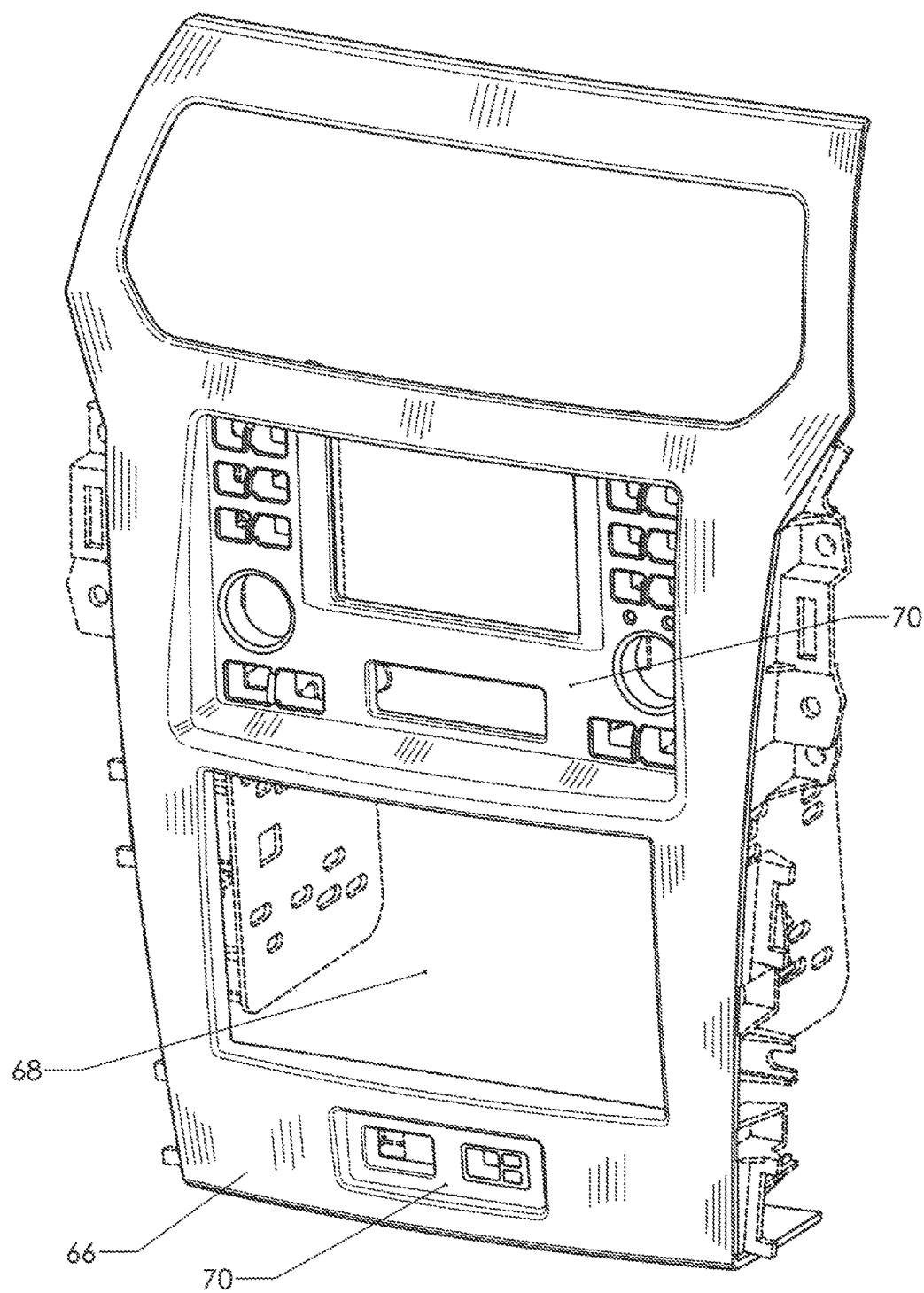
FIG. 15 is a perspective view, showing a prior art bezel configured to mount aftermarket electronics in a particular vehicle.
Figure 16:
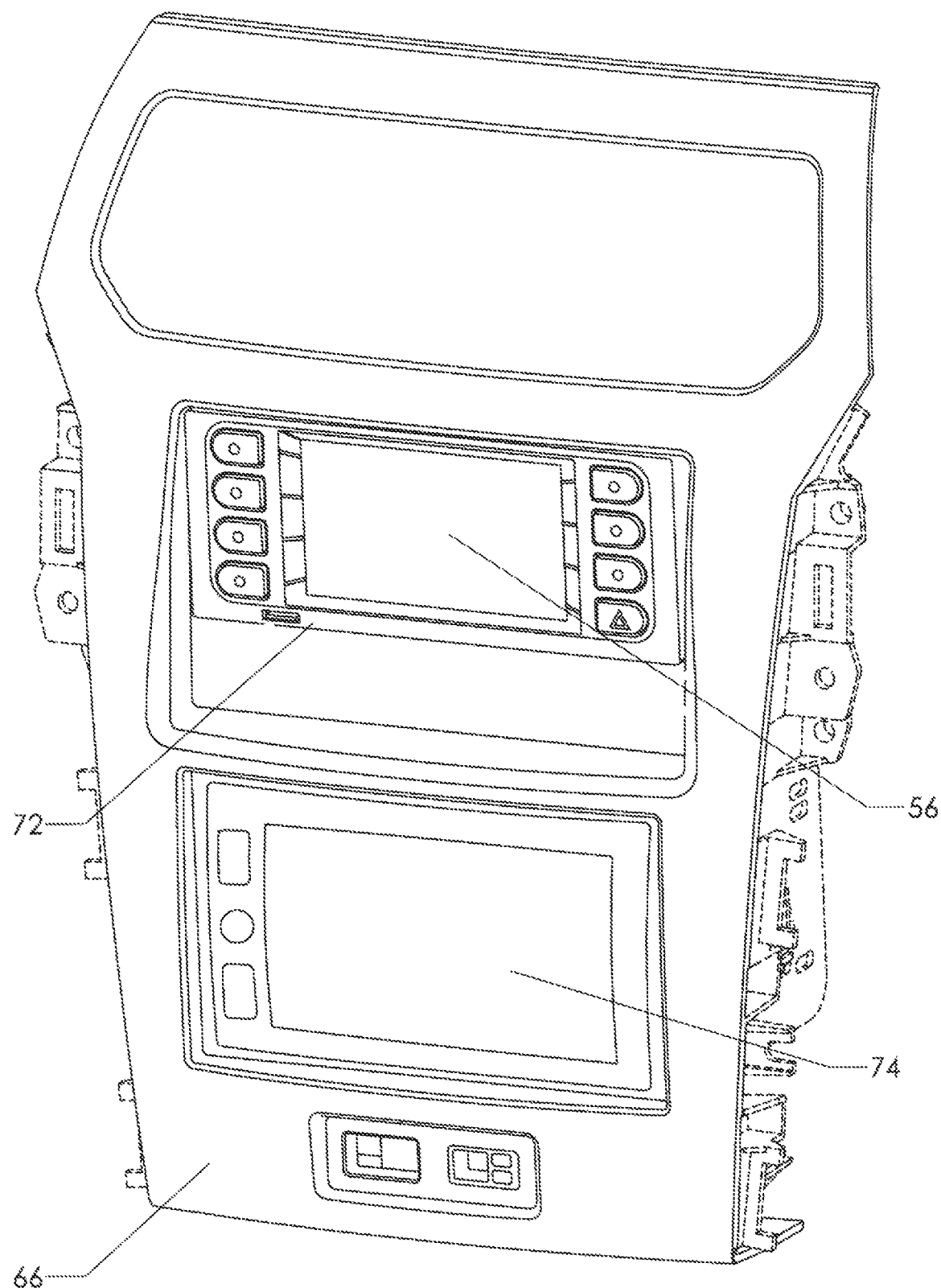
FIG. 16 is a perspective view, showing the bezel of FIG. 15 modified to accommodate a touch screen module and an aftermarket stereo.

The touch screen module can be integrated into a vehicle in many different ways. FIGS. 15 and 16 illustrate one approach to vehicle integration. Metra Electronics, Inc. of Holly Hills, Florida manufacturers a range of vehicle-specific bezels that facilitate the mounting of aftermarket electronics components in a vehicle. FIG. 15 is labeled as "prior art" not because the illustrated components are in the public domain but rather because they are covered in other, older patents belonging to Metra.

Vehicle-specific bezel 66 in FIG. 15 is designed to replace an existing component in a Ford pick-up truck. It includes double-DIN opening 68, which is sized to receive a standard aftermarket stereo ("DIN" is an acronym designating the German Institute for Standardization. This body promulgated standard dimensions for aftermarket stereo components that are now widely accepted).

Bezel 66 is sized to replace a bezel originally found in the Ford truck. OEM control panel 70 is designed to accommodate a series of buttons and knobs that were mounted on the original factory bezel. For example, climate control function buttons and knobs must be included in this panel. In many instances replacement switches and knobs will have to be provided with the replacement bezel, and emulator circuit boards may also be required to "fool" the OEM electronics into "thinking" that the OEM components are still in place. All these components are expensive and their inclusion drives up the cost of a replacement bezel. Altering this design to utilize more standardized hardware is advantageous.

FIG. 16 shows a different version of vehicle-specific bezel 66 that has been altered to include module receiver 72. Module receiver 72 is configured to receive and retain touch screen module 56. Double-DIN stereo/NAV unit 74 has been placed in double-DIN opening 68. Touch-screen module 56 replaces all the OEM button functions found in the original bezel shown in FIG. 15. For example, control of the vehicle's environmental systems can be provided by the touch-screen user interface. Some or all of the controls may also be mapped to the physical keys provided in touch-screen module 56.

The use of a module receiver 72 in a vehicle-specific bezel allows a single standardized touch-screen module to be used in many different replacement bezels. Each vehicle-specific bezel must have vehicle-matching contours and mounting systems. However, the use of the standard touch-screen module will facilitate economies of scale. The programmability of the touch-screen module and the variety of interface jacks it includes means that the same touch-screen module may be used to replace and emulate many different OEM systems.

The auto-detection capability described previously is preferably included in the touch-screen module. When the module is connected to the vehicle's CAN bus it will then sample the existing data traffic and determine what type of vehicle it has been plugged into. The module will then automatically configure itself to send and receive messages on the particular type of CAN bus it has detected.

Each device connected to the CAN bus becomes a communication node. All nodes then listen for all messages broadcast on the CAN bus. There is typically an arbitration process for determining dominant and recessive nodes in the event of conflicting transmissions. Recessive nodes cease transmission. Simultaneous node transmissions do occur, but the arbitration process rapidly resolves the conflict. There are also arbitration schemes based on message prioritization, which allow increased overall system performance and reduce the chance of a system-critical message being unduly delayed.

There is a huge amount of information available on modern vehicle CAN buses. A small part of this information is displayed to the vehicle operator, such as vehicle speed and engine coolant temperature. A great deal more information is available but only used by the vehicle systems themselves. The present inventive system could make much more of the existing information available to the user. A typical CAN bus includes data such as the following: (1) brake pedal position, (2) brake pressure, (3) engine RPM, (4) vehicle speed, (5) accelerator pedal position, (6) gear selector position, (7) current gear, (8) coolant temperature, (9) fuel temperature, (10) oil temperature, (11) transmission fluid temperature, (12) air mass sensor reading, (14) exhaust oxygen sensor(s) reading, (15) individual wheel speed, (16) dynamic stability control state, (17) engine load state, and (18) various user input control states—such as steering wheel switches.

The inventive touch-screen device could use the existing CAN data to provide features and functions the vehicle manufacturers did not provide. A simple example concerning an electronic fuel injection ("EFI") system will illustrate this point. Nearly all EFI systems include a coolant temperature sensor and a fuel temperature sensor. The coolant temperature sensor allows the engine control unit ("ECU") to "know" the engine is cold and react by providing a richer fuel-to-air ratio until the engine warms up. The fuel temperature sensor allows the ECU to compensate for reduced fuel density at elevated temperatures (typically by increasing injector dwell times to increase the volume of fuel delivered at elevated temperatures).

ECU's typically include fault detection for both the coolant temperature sensor and the fuel temperature sensor. Both these sensors are expected to operate within a defined range. The following table shows a representative range for these two sensors:

|  | Cold Start | Hot Operating |
| --- | --- | --- |
| Coolant Temp | −20 to 100 deg F. (−11 to 38 deg C.) | 200 to 220 deg F. (93 to 104 deg C.) |
| Fuel Temp | −20 to 100 deg F. (−11 to 38 deg C.) | 130 deg F. (54 deg C.) |

The vehicle ECU is often configured to detect a sensor fault by a reading that is far outside of the expected range. Most temperature sensors fail completely rather than by giving erroneous readings, so a fairly liberal "normal" range is typically used. For the temperature sensors, a "normal" range of −40 deg F. to 250 deg F. might be used.

In some vehicles a common "mechanic's error" is to reverse the connectors for the coolant and fuel temperature sensors. In other words, following a repair, a mechanic mistakenly connects the coolant temperature plug to the fuel temperature sensor and vice-versa. Power is then restored to the car and the car is started and operated. The ECU never detects an error, because the reading for both temperature sensors remains within the "normal" range. Consider, however, the effect on operation: The vehicle starts normally with both coolant and fuel being sensed as "cold" (50 deg F., for example). The ECU sets the mixture rich.

As the engine's thermostat opens the coolant temperature warms up to a normal level of around 200 deg F. Fuel is continuously pumped into the fuel injection rail. It will be heated somewhat by the engine but tends to remain closer to the temperature of the fuel in the tank. Thus, the fuel temperature stabilizes at 70 deg F. However, because of the connector mix-up, the ECU "thinks" it is seeing a coolant temperature of 70 deg F. and a fuel temperature of 200 deg F. It responds to the very high fuel temperature by increasing the injector dwell time. This makes the mixture even richer.

The result is a very rich mixture that will reduce fuel economy, increase exhaust emissions, and possibly damage any installed catalytic converters. The driver will likely note a rough idle and possible stalling, but he or she will not know why. The ECU does not sense any error and displays no error codes. The data to clearly discern the error is available on the CAN bus, however. The present invention could be useful in several ways. First, the present invention can actually display all the values that are being used by the ECU. The ECU is typically programmed to use raw values that are not converted into useful units (such as degrees C. or F). However, it is a simple matter for the processor within the inventive touch-screen module to perform these manufacturer-specific conversions. The data would be converted to an actual temperature and displayed to the user. A knowledgeable user would quickly discern that the values for the coolant and fuel temperature sensors look suspicious. He or she could then investigate further to find the cause.

More sophisticated analytical software could be provided in some inventive embodiments. This software could look for data patterns conforming to known problems, with the list of "known" problems being continually updated for particular vehicles. Such updates could be loaded via data jack 76 when the software is updated. In these embodiments, the inventive touch screen data could actually detect the unusual sensor problem and alert the user to its likely source.

Another example concerns fuel vapor purge canisters that are now common in fuel-injected cars. In these vehicles the fuel tank is not vented to the atmosphere when the engine is stopped. Instead, vapor is collected in a filter canister. The ECU controls a purge valve connecting this filter canister to the engine's intake manifold when the engine is running. The ECU periodically opens the purge valve to pull accumulated gasoline vapor into the engine.

Many vehicles are equipped with pressure sensors to monitor the gasoline vapor and ensure that it is being pulled into the engine. If a user refuels and fails to tightly secure the gas cap, the pressure sensors will read an error and the ECU will store an error code and usually illuminate a "check engine" light. The driver may then have to take the vehicle to a dealer and incur expense for a trivial problem.

The present invention can read the error code off the CAN bus and display a user message such as "CHECK ENGINE LIGHT ILLUMINATED—CHECK TO BE SURE GAS CAP IS FULLY TIGHTENED AND THEN RESTART VEHICLE." The user would then follow these instructions. If the problem was indeed the gas cap, the pressure error message would no longer be detected on the CAN bus. This result then implicates at least two options for the present invention.

A standard practice in the automotive industry is for the ECU to retain error codes in memory and continue to display the presence of an error to the driver—usually by illuminating a "check engine" light. A "check engine" light is notoriously non-specific. It may indicate a trivial problem or a more serious one. The modern driver is expected to take the vehicle to a service technician. The vehicle manufacturers promote the idea of service being performed only at an authorized dealer. Fortunately, legislation has required the manufacturers to make at least some of the error code information available to independent service technicians and technically savvy owner-operators.

Even after the problem generating the error message is solved most ECU's will continue to display the message. The error code must be "cleared." This is generally done by a plug-in diagnostic device. The present inventive system would also be capable of clearing the error message.

Once the processor in the touch screen module monitors the CAN bus for long enough to ensure that the pressure error problem is resolved, the user could be given the option to clear the error code by an input in the user interface. This option might be limited to minor problems, with a more serious indication requiring the user to either take the vehicle to a service tech or verify the completion of certain tests (such an ensuring that the vehicle emissions are still within limits). The user might also be given no option to clear error codes or might be given the option to clear all error codes after reading a warning message and clicking an acknowledgement.

The reader will thereby understand that the present invention allows the user to receive practically any piece of information that is carried on a vehicle CAN bus and display it in a desirable way. Further, the invention allows the user to input commands that will be carried on the CAN bus and implemented by other vehicle systems. This functionality allows the substitution of a software-based user interface for an array of mechanical buttons, knobs, and switches.

While the uses for the invention are practically limitless, some possible scenarios are listed in the following:

1. Some drivers prefer the automated engine management systems now in use where only a "problem" condition is displayed (sometimes referred to as an "idiot light" display). Other drivers, however, like to monitor the engine condition manually. The touch screen display could provide a graphical depiction of an analog instrument panel, including simulated "gauges" showing engine RPM, coolant temperature, oil temperature, and oil pressure.

2. Since the vehicle's digital network allows control of seat and mirror functions, an individual driver can store his or her favorite selections in the memory of the touch-screen module or other embodiment. These can then be loaded when the system is booted up and the seats and mirrors will move to the preselected positions. In addition, the driver might have more than one saved set. For example, the driver might have settings for "sport" and settings for "highway." The substantial amount of memory available on the user interface device allows many different drivers to store custom settings.

3. In many instances the engine measuring instruments just provide raw data that is only meaningful to the software controlling the engine. An example is exhaust oxygen sensors. These often provide a raw resistance that is translated to a simple number. The number will not likely mean anything to the user. However, software running within the user interface device can translate this number to an associated air/fuel ratio and display the result. Once this is done, the user can quickly see whether the car is running rich or lean.

4. Vehicle error codes are likewise just a meaningless number. Software running on the user interface can use the error codes to display more meaningful information. An example would be "emission system error detected." Even that information may not be helpful to the user so the user interface could provide vehicle-specific advice, such as "An emission system error has been detected. This may be a result of the fuel cap not being screwed on tightly. Suggest shutting off the car, tightening the cap, and restarting the car." The interface could even provide a short video explaining what to do.

5. Most vehicle error codes will trip a warning light in a dash or instrument display. These can be quite annoying as the error may be a transient event but the light will remain on until the vehicle is taken to a service facility. The user interface of the present invention may be configured to allow the user to clear the code and thereby extinguish the warning light. On the other hand, clearing the code often removes it from the vehicle's on board computer (causing a problem when the vehicle is brought in for service). The user interface device (or even the interface/electronics module) may be configured to retain in its own separate memory of the error code history. In this way, the error code is retained for future reference even though it has been "cleared" from the vehicle.

6. The user interface device can store and provide service information and/or "tips" from vehicle user groups.

7. The user interface device can store user-customizable radio station and/or satellite station presets, bass/treble settings, etc.

8. The user interface could include an internal battery to maintain its memory in the event that vehicle power is lost for an extended period.

9. The user interface device can "cross-check" available sensor information on the CAN bus. For instance, many EFI systems have an intake air sensor that is used to calculate air density for setting the fuel-to-air ratio. The car's body control module ("BCM") typically has an outside air temperature sensor that is used for driver information and—in some vehicles—to alter the dynamic stability control settings (for icy conditions). The processor in the touch-screen module can use a "cold start" at the beginning of the day to cross-check the EFI's intake temperature sensor against the BCM's outside air temperature sensor. Upon the first start of the day the sensed temperatures from these two devices should be very close. If they are not, the inventive system can alert the user.

10. Continuing the prior example the inventive system could detect a sensor mis-match and even present this information to the user for resolution. A message on the graphical user interface might read: "Intake air temperature sensor reads 105 deg F. (41 deg C.). Outside air temperature sensor reads 40 deg F. (4 deg C.). Is the outside temperature 105 degrees or 40 degrees?" The user would then select an option. If, for example, the user selects "40 deg F." then the inventive system would tell the user that the EFI intake air sensor is likely defective.

11. The inventive system can be used in conjunction with other aftermarket electronic devices, such as an aftermarket stereo/nav system. In this arrangement the inventive touch-screen module may be used to read steering wheel control inputs (such as volume up or volume down) off the CAN bus and convert these to signs that may be read and implemented by the stereo/nav system. In this implementation, the touch-screen module is acting as an interface between the physical steering wheel buttons and the aftermarket stereo—among other things.

12. The touch-screen module can be used to manually configure the unit for the type of vehicle it is installed in. The user can pick through a series of selections (model year/make/model/options).

The reader will thereby appreciate that the present invention can read data and commands from a CAN bus and apply data and commands on a CAN bus. Further, the invention provides a graphic user interface displayed on a display screen. User inputs are accommodated via a touch screen capability on the display, physical input buttons, or both.

The term "interface/electronics module" may include multiple components connected together, such as the embodiment of FIG. 8 where the user interface features are included on a separate tablet. The term may also include a unified assembly such as the embodiment of FIG. 10 and the embodiment of FIG. 13.

The term "OEM component" means any component installed by a vehicle manufacturer and intended to operate via a CAN bus command. Examples include seat adjustment motors, mirror adjustment motors, A/C compressor controls, fan blower motors, etc.

The term "specific vehicle type" means the level of specificity needed to get to the proper CAN bus format. For example, for "Manufacturer A" all of its vehicles use the exact same CAN bus format and merely knowing the manufacturer's identity may be enough. For "Manufacturer B" multiple CAN bus formats may be in use depending on model year and specific vehicle model. For this manufacturer more detail (such as the year of manufacture, vehicle model, and even model option codes) may be needed The phrase "display said messages in a user-readable format" means any format that will be understood by a typical user. Text language is included in this definition, as are icon-based depictions.

The phrase "OEM components is commanded to act" means that one of the OEM components is given a command that prompts it to take a certain action. For example, a fan blower motor may be given a CAN bus command requiring it to turn on at its lowest available flow rate.

The phrase "a plurality of CAN message formats corresponding to a plurality of vehicle types" means that the memory associated with the interface/electronics module stores multiple CAN formats so that the same module can be installed in differing vehicle types and still function. The CAN message format for the particular vehicle will be called up and used.

The term "engine parameters" means things like RPM, throttle position, mass air flow, coolant temperature, etc.

Although the preceding descriptions contain significant detail, they should not be construed as limiting the scope of the invention but rather as providing illustrations of the preferred embodiments of the invention. Those skilled in the art will know that many other variations are possible without departing from the scope of the invention. Accordingly, the scope of the invention should properly be determined with respect to the claims that are ultimately drafted rather than the examples given.

Having described our invention, we claim:

1. An aftermarket vehicle information and control interface method configured for use on a vehicle originally having a factory radio, a plurality of speakers, a CAN bus operating in a particular CAN message format, and a plurality of OEM components connected to said CAN bus, said OEM components being responsive to commands transmitted via said CAN bus, comprising:
 (a) removing said factory radio from said vehicle;
 (b) installing an interface/electronics module, including,
   (i) a processor,
   (ii) an associated memory,
   (iii) a power amplifier,
   (iv) said interface/electronics module being configured to receive a signal from an audio source, amplify said signal and transmit said signal to said plurality of speakers;
 (c) providing a tablet that is housed separately from said interface/electronics module, said tablet including a touchscreen;
 (d) using said tablet to display messages and receive inputs suitable for the control of said interface/electronics module;
 (e) said tablet being connected to said electronics/interface module so that user inputs made to said tablet can control operations of said electronics/interface module;
 (f) said tablet and said interface/electronics module in combination being configured to replace said factory radio;
 (g) loading said particular CAN message format in said associated memory;
 (h) said interface/electronics module using said particular CAN message format to read messages on said CAN bus and send said read messages to said tablet for display in a user-readable format on said tablet; and
 (i) said tablet receiving a user selection by said touchscreen and said interface/electronics module creating a CAN message in said particular CAN message format responsive to said user selection and placing said responsive CAN signal on said CAN bus, thereby commanding one of said OEM components to act.

2. The aftermarket vehicle information and control interface method as recited in claim 1, wherein said connection between said tablet and said interface/electronics module is a hardwired connection.

3. The aftermarket vehicle information and control interface method as recited in claim 1, wherein said connection between said tablet and said interface/electronics module is a wireless connection.

4. The aftermarket vehicle information and control interface method as recited in claim 1, wherein said tablet is mounted in a tablet receiver in a location formerly occupied by said factory radio.

5. The aftermarket vehicle information and control interface method as recited in claim 1, further comprising selecting said CAN message format from among a plurality of available CAN message formats.

6. The aftermarket vehicle information and control interface method as recited in claim 4, further comprising providing a fascia surrounding said tablet receiver, said fascia blending smoothly into a dash of said vehicle.

7. The aftermarket vehicle information and control interface method as recited in claim 1, wherein said interface/electronics module further comprises non-CAN inputs.

8. The aftermarket vehicle information and control interface method as recited in claim 1, wherein said interface/electronics module reads an engine parameter from said CAN bus and displays said engine parameter on said touch screen.

9. The aftermarket vehicle information and control interface method as recited in claim 1, wherein said associated memory stores a set of custom settings for a particular user.

10. The aftermarket vehicle information and control interface method as recited in claim 1, wherein said associated memory stores multiple sets of custom settings for multiple users.

11. An aftermarket vehicle information and control interface method configured for use on a vehicle originally having a factory radio, a plurality of speakers, a CAN bus operating in a particular CAN message format, and a plurality of OEM components connected to said CAN bus, said OEM components being responsive to commands transmitted via said CAN bus, comprising:
 (a) removing said factory radio from said vehicle;
 (b) installing an interface/electronics module in said vehicle, including,
   (i) a processor,
   (ii) an associated memory
   (iii) a radio frequency tuner configured to received broadcasts and provide an audio source;
   (iv) said interface/electronics module being configured to receive a signal from said audio source, amplify said signal and transmit said signal to said plurality of speakers;
 (c) providing a tablet that is located apart from said interface/electronics module, said tablet including a touchscreen;
 (d) said tablet including a touchscreen display configured to display messages and receive user inputs suitable for the control of said interface/electronics module;
 (e) said tablet being connected to said electronics/interface module so that user inputs made to said tablet can control operations of said electronics/interface module;
 (f) loading said particular CAN message format in said associated memory;
 (g) connecting said interface/electronics module to said vehicle CAN bus;
 (h) said tablet displaying a user-readable messages based on a CAN bus message that is read by said interface/electronics module;
 (i) said tablet receiving a user selection by said touchscreen and sending said user selection to said interface/electronics module; and
 (j) said interface/electronics module then creating a CAN message in said particular CAN message format responsive to said user selection and placing said responsive CAN message on said CAN bus, thereby commanding one of said OEM components to act.

12. The aftermarket vehicle information and control interface method as recited in claim 11, wherein said connection between said tablet and said interface/electronics module is a hardwired connection.

13. The aftermarket vehicle information and control interface method as recited in claim 11, wherein said connection between said tablet and said interface/electronics module is a wireless connection.

14. The aftermarket vehicle information and control interface method as recited in claim 11, wherein said tablet is mounted in a tablet receiver in a location formerly occupied by said factory radio.

15. The aftermarket vehicle information and control interface method as recited in claim 11, further comprising selecting said CAN message format from among a plurality of available CAN message formats.

16. The aftermarket vehicle information and control interface method as recited in claim 14, further comprising providing a fascia surrounding said tablet receiver, said fascia blending smoothly into a dash of said vehicle.

17. The aftermarket vehicle information and control interface method as recited in claim 11, wherein said interface/electronics module further comprises non-CAN inputs.

18. The aftermarket vehicle information and control interface method as recited in claim 11, wherein said interface/electronics module reads an engine parameter from said CAN bus and displays said engine parameter on said touch screen.

19. The aftermarket vehicle information and control interface method as recited in claim 11, wherein said associated memory stores a set of custom settings for a particular user.

20. The aftermarket vehicle information and control interface method as recited in claim 11, wherein said associated memory stored multiple sets of custom settings for multiple users.

* * * * *